(12) United States Patent
Miyanaga

(10) Patent No.: US 8,707,768 B2
(45) Date of Patent: Apr. 29, 2014

(54) COMPUTER READABLE STORAGE MEDIUM STORING INFORMATION PROCESSING PROGRAM AND INFORMATION PROCESSING APPARATUS

(75) Inventor: Makoto Miyanaga, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 230 days.

(21) Appl. No.: 13/289,129

(22) Filed: Nov. 4, 2011

(65) Prior Publication Data

US 2012/0048004 A1    Mar. 1, 2012

Related U.S. Application Data

(63) Continuation of application No. 12/510,437, filed on Jul. 28, 2009, now Pat. No. 8,079,251.

(30) Foreign Application Priority Data

Mar. 9, 2009    (JP) .................................. 2009-054979

(51) Int. Cl.
*G01M 1/00*    (2006.01)
(52) U.S. Cl.
USPC ........................................ 73/65.01; 73/65.07
(58) Field of Classification Search
USPC ............................................ 73/65.01–65.09
See application file for complete search history.

(56) References Cited

U.S. PATENT DOCUMENTS

| | | | |
|---|---|---|---|
| 588,172 A | 8/1897 | Peters | |
| 688,076 A | 12/1901 | Ensign | |
| D188,376 S | 7/1960 | Hotkins et al. | |
| 3,184,962 A | 5/1965 | Gay | |
| 3,217,536 A | 11/1965 | Motsinger et al. | |
| 3,424,005 A | 1/1969 | Brown | |
| 3,428,312 A | 2/1969 | Machen | |
| 3,712,294 A | 1/1973 | Muller | |
| 3,752,144 A | 8/1973 | Weigle, Jr. | |
| 3,780,817 A | 12/1973 | Videon | |
| 3,826,145 A | 7/1974 | McFarland | |
| 3,869,007 A | 3/1975 | Haggstrom et al. | |

(Continued)

FOREIGN PATENT DOCUMENTS

| | | |
|---|---|---|
| DE | 40 04 554 | 8/1991 |
| DE | 195 02 918 | 8/1996 |

(Continued)

OTHER PUBLICATIONS

Addlesee, M.D., et al., "The ORL Active Floor," IEEE—Personal Communications, Oct. 1997.

(Continued)

*Primary Examiner* — Max Noori
(74) *Attorney, Agent, or Firm* — Nixon & Vanderhye PC

(57) ABSTRACT

An information processing apparatus processes an input signal from a load controller including an input surface and a load detecting means for detecting a load value applied to the input surface. The information processing apparatus detects a center-of-gravity position of a load applied to the input surface of the load controller based on the input signal from the load detecting means. The information processing apparatus determines whether or not the load value applied to the load controller is smaller than a predetermined value, based on the load value detected by the load detecting means, and when the result of determination is positive, executes a menu operation process based on the center-of-gravity position.

15 Claims, 15 Drawing Sheets

(56) References Cited

U.S. PATENT DOCUMENTS

| | | | |
|---|---|---|---|
| 4,058,178 A | 11/1977 | Shinohara et al. |
| 4,104,119 A | 8/1978 | Schilling |
| 4,136,682 A | 1/1979 | Pedotti |
| 4,246,783 A | 1/1981 | Steven et al. |
| 4,296,931 A | 10/1981 | Yokoi |
| 4,337,050 A | 6/1982 | Engalitcheff, Jr. |
| 4,404,854 A | 9/1983 | Krempl et al. |
| 4,488,017 A | 12/1984 | Lee |
| 4,494,754 A | 1/1985 | Wagner, Jr. |
| 4,558,757 A | 12/1985 | Mori et al. |
| 4,569,519 A | 2/1986 | Mattox et al. |
| 4,574,899 A | 3/1986 | Griffin |
| 4,577,868 A | 3/1986 | Kiyonaga |
| 4,598,717 A | 7/1986 | Pedotti |
| 4,607,841 A | 8/1986 | Gala |
| 4,630,817 A | 12/1986 | Buckleu |
| 4,660,828 A | 4/1987 | Weiss |
| 4,680,577 A | 7/1987 | Straayer et al. |
| 4,688,444 A | 8/1987 | Nordstrom |
| 4,691,694 A | 9/1987 | Boyd et al. |
| 4,711,447 A | 12/1987 | Mansfield |
| 4,726,435 A | 2/1988 | Kitagawa et al. |
| 4,739,848 A | 4/1988 | Tulloch |
| 4,742,832 A | 5/1988 | Kauffmann et al. |
| 4,742,932 A | 5/1988 | Pedragosa |
| 4,800,973 A | 1/1989 | Angel |
| 4,838,173 A | 6/1989 | Schroeder et al. |
| 4,855,704 A | 8/1989 | Betz |
| 4,880,069 A | 11/1989 | Bradley |
| 4,882,677 A | 11/1989 | Curran |
| 4,893,514 A | 1/1990 | Gronert et al. |
| 4,907,797 A | 3/1990 | Gezari et al. |
| 4,927,138 A | 5/1990 | Ferrari |
| 4,970,486 A | 11/1990 | Gray et al. |
| 4,982,613 A | 1/1991 | Becker |
| D318,073 S | 7/1991 | Jang |
| 5,044,956 A | 9/1991 | Behensky et al. |
| 5,049,079 A | 9/1991 | Furtado et al. |
| 5,052,406 A | 10/1991 | Nashner |
| 5,054,771 A | 10/1991 | Mansfield |
| 5,065,631 A | 11/1991 | Ashpitel et al. |
| 5,089,960 A | 2/1992 | Sweeney, Jr. |
| 5,103,207 A | 4/1992 | Kerr et al. |
| 5,104,119 A | 4/1992 | Lynch |
| 5,116,296 A | 5/1992 | Watkins et al. |
| 5,118,112 A | 6/1992 | Bregman et al. |
| 5,151,071 A | 9/1992 | Jain et al. |
| 5,195,746 A | 3/1993 | Boyd et al. |
| 5,197,003 A | 3/1993 | Moncrief et al. |
| 5,199,875 A | 4/1993 | Trumbull |
| 5,203,563 A | 4/1993 | Loper, III |
| 5,207,426 A | 5/1993 | Inoue et al. |
| 5,259,252 A | 11/1993 | Kruse et al. |
| 5,269,318 A | 12/1993 | Nashner |
| 5,299,810 A | 4/1994 | Pierce et al. |
| 5,303,715 A | 4/1994 | Nashner et al. |
| 5,360,383 A | 11/1994 | Boren |
| 5,362,298 A | 11/1994 | Brown et al. |
| 5,368,546 A | 11/1994 | Stark et al. |
| 5,405,152 A | 4/1995 | Katanics et al. |
| 5,431,569 A | 7/1995 | Simpkins et al. |
| 5,462,503 A | 10/1995 | Benjamin et al. |
| 5,466,200 A | 11/1995 | Ulrich et al. |
| 5,469,740 A | 11/1995 | French et al. |
| 5,474,087 A | 12/1995 | Nashner |
| 5,476,103 A | 12/1995 | Nahsner |
| 5,507,708 A | 4/1996 | Ma |
| 5,541,621 A | 7/1996 | Nmngani |
| 5,541,622 A | 7/1996 | Engle et al. |
| 5,547,439 A | 8/1996 | Rawls et al. |
| 5,551,445 A | 9/1996 | Nashner |
| 5,551,693 A | 9/1996 | Goto et al. |
| 5,577,981 A | 11/1996 | Jarvik |
| D376,826 S | 12/1996 | Ashida |
| 5,584,700 A | 12/1996 | Feldman et al. |
| 5,584,779 A | 12/1996 | Knecht et al. |
| 5,591,104 A | 1/1997 | Andrus et al. |
| 5,613,690 A | 3/1997 | McShane et al. |
| 5,623,944 A | 4/1997 | Nashner |
| 5,627,327 A | 5/1997 | Zanakis |
| D384,115 S | 9/1997 | Wilkinson et al. |
| 5,669,773 A | 9/1997 | Gluck |
| 5,689,285 A | 11/1997 | Asher |
| 5,690,582 A | 11/1997 | Ulrich et al. |
| 5,697,791 A | 12/1997 | Nashner et al. |
| 5,713,794 A | 2/1998 | Shimojima et al. |
| 5,721,566 A | 2/1998 | Rosenberg et al. |
| 5,746,684 A | 5/1998 | Jordan |
| 5,785,630 A | 7/1998 | Bobick et al. |
| D397,164 S | 8/1998 | Goto |
| 5,788,618 A | 8/1998 | Joutras |
| 5,792,031 A | 8/1998 | Alton |
| 5,800,314 A | 9/1998 | Sakakibara et al. |
| 5,805,138 A | 9/1998 | Brawne et al. |
| 5,813,958 A | 9/1998 | Tomita |
| 5,814,740 A | 9/1998 | Cook et al. |
| 5,820,462 A | 10/1998 | Yokoi et al. |
| 5,825,308 A | 10/1998 | Rosenberg |
| 5,837,952 A | 11/1998 | Oshiro et al. |
| D402,317 S | 12/1998 | Goto |
| 5,846,086 A | 12/1998 | Bizzi et al. |
| 5,853,326 A | 12/1998 | Goto et al. |
| 5,854,622 A | 12/1998 | Brannon |
| 5,860,861 A | 1/1999 | Lipps et al. |
| 5,864,333 A | 1/1999 | O'Heir |
| 5,872,438 A | 2/1999 | Roston |
| 5,886,302 A | 3/1999 | Germanton et al. |
| 5,888,172 A | 3/1999 | Andrus et al. |
| 5,889,507 A | 3/1999 | Engle et al. |
| D407,758 S | 4/1999 | Isetani et al. |
| 5,890,995 A | 4/1999 | Bobick et al. |
| 5,897,457 A | 4/1999 | Mackovjak |
| 5,897,469 A | 4/1999 | Yalch |
| 5,901,612 A | 5/1999 | Letovsky |
| 5,902,214 A | 5/1999 | Makikawa et al. |
| 5,904,639 A | 5/1999 | Smyser et al. |
| D411,258 S | 6/1999 | Isetani et al. |
| 5,912,659 A | 6/1999 | Rutledge et al. |
| 5,919,092 A | 7/1999 | Yokoi et al. |
| 5,921,780 A | 7/1999 | Myers |
| 5,921,899 A | 7/1999 | Rose |
| 5,929,782 A | 7/1999 | Stark et al. |
| 5,947,824 A | 9/1999 | Minami et al. |
| 5,976,063 A | 11/1999 | Joutras et al. |
| 5,980,256 A | 11/1999 | Carmein |
| 5,980,429 A | 11/1999 | Nashner |
| 5,984,785 A | 11/1999 | Takeda et al. |
| 5,987,982 A | 11/1999 | Wenman et al. |
| 5,989,157 A | 11/1999 | Walton |
| 5,993,356 A | 11/1999 | Houston et al. |
| 5,997,439 A | 12/1999 | Ohsuga et al. |
| 6,001,015 A | 12/1999 | Nishiumi et al. |
| 6,007,428 A | 12/1999 | Nishiumi et al. |
| 6,010,465 A | 1/2000 | Nashner |
| D421,070 S | 2/2000 | Jang et al. |
| 6,037,927 A | 3/2000 | Rosenberg |
| 6,038,488 A | 3/2000 | Barnes et al. |
| 6,044,772 A | 4/2000 | Gaudette et al. |
| 6,063,046 A | 5/2000 | Allum |
| 6,086,518 A | 7/2000 | MacCready, Jr. |
| 6,102,803 A | 8/2000 | Takeda et al. |
| 6,102,832 A | 8/2000 | Tani |
| D431,051 S | 9/2000 | Goto |
| 6,113,237 A | 9/2000 | Ober et al. |
| 6,147,674 A | 11/2000 | Rosenberg et al. |
| 6,152,564 A | 11/2000 | Ober et al. |
| D434,769 S | 12/2000 | Goto |
| D434,770 S | 12/2000 | Goto |
| 6,155,926 A | 12/2000 | Miyamoto et al. |
| 6,162,189 A | 12/2000 | Girone et al. |
| 6,167,299 A | 12/2000 | Galchenkov et al. |
| 6,190,287 B1 | 2/2001 | Nashner |
| 6,200,253 B1 | 3/2001 | Nishiumi et al. |
| 6,203,432 B1 | 3/2001 | Roberts et al. |

(56) References Cited

U.S. PATENT DOCUMENTS

| | | |
|---|---|---|
| 6,216,542 B1 | 4/2001 | Stockli et al. |
| 6,216,547 B1 | 4/2001 | Lehtovaara |
| 6,220,865 B1 | 4/2001 | Macri et al. |
| D441,369 S | 5/2001 | Goto |
| 6,225,977 B1 | 5/2001 | Li |
| 6,227,968 B1 | 5/2001 | Suzuki et al. |
| 6,228,000 B1 | 5/2001 | Jones |
| 6,231,444 B1 | 5/2001 | Goto |
| 6,239,806 B1 | 5/2001 | Nishiumi et al. |
| 6,241,611 B1 | 6/2001 | Takeda et al. |
| 6,244,987 B1 | 6/2001 | Ohsuga et al. |
| D444,469 S | 7/2001 | Goto |
| 6,264,558 B1 | 7/2001 | Nishiumi et al. |
| 6,280,361 B1 | 8/2001 | Harvey et al. |
| D447,968 S | 9/2001 | Pagnacco et al. |
| 6,295,878 B1 | 10/2001 | Berme |
| 6,296,595 B1 | 10/2001 | Stark et al. |
| 6,325,718 B1 | 12/2001 | Nishiumi et al. |
| 6,330,837 B1 | 12/2001 | Charles et al. |
| 6,336,891 B1 | 1/2002 | Fedrigon et al. |
| 6,353,427 B1 | 3/2002 | Rosenberg |
| 6,354,155 B1 | 3/2002 | Berme |
| 6,357,827 B1 | 3/2002 | Brightbill et al. |
| 6,359,613 B1 | 3/2002 | Poole |
| D456,410 S | 4/2002 | Ashida |
| D456,854 S | 5/2002 | Ashida |
| D457,570 S | 5/2002 | Brinson |
| 6,387,061 B1 | 5/2002 | Nitto |
| 6,388,655 B1 | 5/2002 | Leung |
| 6,389,883 B1 | 5/2002 | Berme et al. |
| 6,394,905 B1 | 5/2002 | Takeda et al. |
| 6,402,635 B1 | 6/2002 | Nesbit et al. |
| D459,727 S | 7/2002 | Ashida |
| D460,506 S | 7/2002 | Tamminga et al. |
| 6,421,056 B1 | 7/2002 | Nishiumi et al. |
| 6,436,058 B1 | 8/2002 | Krahner et al. |
| D462,683 S | 9/2002 | Ashida |
| 6,454,679 B1 | 9/2002 | Radow |
| 6,461,297 B1 | 10/2002 | Pagnacco et al. |
| 6,470,302 B1 | 10/2002 | Cunningham et al. |
| 6,482,010 B1 | 11/2002 | Marcus et al. |
| 6,510,749 B1 | 1/2003 | Pagnacco et al. |
| 6,514,145 B1 | 2/2003 | Kawabata et al. |
| 6,515,593 B1 | 2/2003 | Stark et al. |
| 6,516,221 B1 | 2/2003 | Hirouchi et al. |
| D471,594 S | 3/2003 | Nojo |
| 6,543,769 B1 | 4/2003 | Podoloff et al. |
| 6,563,059 B2 | 5/2003 | Lee |
| 6,568,334 B1 | 5/2003 | Gaudette et al. |
| 6,616,579 B1 | 9/2003 | Reinbold et al. |
| 6,624,802 B1 | 9/2003 | Klein et al. |
| 6,632,158 B1 | 10/2003 | Nashner |
| 6,636,161 B2 | 10/2003 | Rosenberg |
| 6,636,197 B1 | 10/2003 | Goldenberg et al. |
| 6,638,175 B2 | 10/2003 | Lee et al. |
| 6,663,058 B1 | 12/2003 | Peterson et al. |
| 6,676,520 B2 | 1/2004 | Nishiumi et al. |
| 6,676,569 B1 | 1/2004 | Radow |
| 6,679,776 B1 | 1/2004 | Nishiumi et al. |
| 6,697,049 B2 | 2/2004 | Lu |
| 6,719,667 B2 | 4/2004 | Wong et al. |
| 6,726,566 B2 | 4/2004 | Komata |
| 6,764,429 B1 | 7/2004 | Michalow |
| 6,797,894 B2 | 9/2004 | Montagnino et al. |
| 6,811,489 B1 | 11/2004 | Shimizu et al. |
| 6,813,966 B2 | 11/2004 | Dukart |
| 6,817,973 B2 | 11/2004 | Merril et al. |
| D500,100 S | 12/2004 | Van Der Meer |
| 6,846,270 B1 | 1/2005 | Etnyre |
| 6,859,198 B2 | 2/2005 | Onodera et al. |
| 6,872,139 B2 | 3/2005 | Sato et al. |
| 6,872,187 B1 | 3/2005 | Stark et al. |
| 6,888,076 B2 | 5/2005 | Hetherington |
| 6,913,559 B2 | 7/2005 | Smith |
| 6,936,016 B2 | 8/2005 | Berme et al. |
| D510,391 S | 10/2005 | Merril et al. |
| 6,975,302 B1 | 12/2005 | Ausbeck, Jr. |
| 6,978,684 B2 | 12/2005 | Nurse |
| 6,991,483 B1 | 1/2006 | Milan et al. |
| D514,627 S | 2/2006 | Merril et al. |
| 7,004,787 B2 | 2/2006 | Milan |
| D517,124 S | 3/2006 | Merril et al. |
| 7,011,605 B2 | 3/2006 | Shields |
| 7,033,176 B2 | 4/2006 | Feldman et al. |
| 7,038,855 B2 | 5/2006 | French et al. |
| 7,040,986 B2 | 5/2006 | Koshima et al. |
| 7,070,542 B2 | 7/2006 | Reyes et al. |
| 7,083,546 B2 | 8/2006 | Zillig et al. |
| 7,100,439 B2 | 9/2006 | Carlucci |
| 7,121,982 B2 | 10/2006 | Feldman |
| 7,126,584 B1 | 10/2006 | Nishiumi et al. |
| 7,127,376 B2 | 10/2006 | Nashner |
| 7,163,516 B1 | 1/2007 | Pagnacco et al. |
| 7,179,234 B2 | 2/2007 | Nashner |
| 7,195,355 B2 | 3/2007 | Nashner |
| 7,202,424 B2 | 4/2007 | Carlucci |
| 7,202,851 B2 | 4/2007 | Cunningham et al. |
| 7,270,630 B1 | 9/2007 | Patterson |
| 7,307,619 B2 | 12/2007 | Cunningham et al. |
| 7,308,831 B2 | 12/2007 | Cunningham et al. |
| 7,331,226 B2 | 2/2008 | Feldman et al. |
| 7,335,134 B1 | 2/2008 | LaVelle |
| RE40,427 E | 7/2008 | Nashner |
| 7,416,537 B1 | 8/2008 | Stark et al. |
| 7,526,071 B2 * | 4/2009 | Drapeau ............... 378/163 |
| 7,530,929 B2 | 5/2009 | Feldman et al. |
| 7,722,501 B2 | 5/2010 | Nicolas et al. |
| 7,938,751 B2 | 5/2011 | Nicolas et al. |
| 8,079,251 B2 * | 12/2011 | Miyanaga ............... 73/65.01 |
| 8,140,228 B2 * | 3/2012 | McCabe et al. ............. 701/50 |
| 8,152,744 B2 * | 4/2012 | Mukumoto ............... 600/592 |
| 2001/0001303 A1 | 5/2001 | Ohsuga et al. |
| 2001/0018363 A1 | 8/2001 | Goto et al. |
| 2001/0026162 A1 * | 10/2001 | Nagai et al. ............... 324/687 |
| 2001/0050683 A1 | 12/2001 | Ishikawa et al. |
| 2002/0055422 A1 | 5/2002 | Airmet et al. |
| 2002/0080115 A1 | 6/2002 | Onodera et al. |
| 2002/0185041 A1 | 12/2002 | Herbst |
| 2003/0054327 A1 | 3/2003 | Evensen |
| 2003/0069108 A1 | 4/2003 | Kaiserman et al. |
| 2003/0107502 A1 | 6/2003 | Alexander |
| 2003/0176770 A1 | 9/2003 | Merril et al. |
| 2003/0184517 A1 | 10/2003 | Senzui et al. |
| 2003/0193416 A1 | 10/2003 | Ogata et al. |
| 2004/0038786 A1 | 2/2004 | Kuo et al. |
| 2004/0041787 A1 | 3/2004 | Graves |
| 2004/0077464 A1 | 4/2004 | Feldman et al. |
| 2004/0099513 A1 | 5/2004 | Hetherington |
| 2004/0110602 A1 | 6/2004 | Feldman |
| 2004/0127337 A1 | 7/2004 | Nashner |
| 2004/0140137 A1 * | 7/2004 | Selig et al. ............... 177/144 |
| 2004/0158380 A1 * | 8/2004 | Farber et al. ............. 701/50 |
| 2004/0163855 A1 | 8/2004 | Carlucci |
| 2004/0180719 A1 | 9/2004 | Feldman et al. |
| 2004/0259688 A1 | 12/2004 | Stabile |
| 2005/0070154 A1 | 3/2005 | Milan |
| 2005/0076161 A1 | 4/2005 | Albanna et al. |
| 2005/0130742 A1 | 6/2005 | Feldman et al. |
| 2005/0202384 A1 | 9/2005 | DiCuccio et al. |
| 2006/0097453 A1 | 5/2006 | Feldman et al. |
| 2006/0161045 A1 | 7/2006 | Merril et al. |
| 2006/0205565 A1 | 9/2006 | Feldman et al. |
| 2006/0211543 A1 | 9/2006 | Feldman et al. |
| 2006/0217243 A1 | 9/2006 | Feldman et al. |
| 2006/0223634 A1 | 10/2006 | Feldman et al. |
| 2006/0258512 A1 | 11/2006 | Nicolas et al. |
| 2007/0021279 A1 | 1/2007 | Jones |
| 2007/0027369 A1 | 2/2007 | Pagnacco et al. |
| 2007/0155589 A1 | 7/2007 | Feldman et al. |
| 2007/0219050 A1 | 9/2007 | Merril |
| 2008/0012826 A1 | 1/2008 | Cunningham et al. |
| 2008/0228110 A1 | 9/2008 | Berme |
| 2008/0245972 A1 | 10/2008 | Drapeau |
| 2008/0261696 A1 | 10/2008 | Yamazaki et al. |

(56) References Cited

U.S. PATENT DOCUMENTS

| | | |
|---|---|---|
| 2009/0093305 A1 | 4/2009 | Okamoto et al. |
| 2009/0093315 A1 | 4/2009 | Matsunaga et al. |
| 2009/0094442 A1 | 4/2009 | Okamoto et al. |
| 2009/0107207 A1 | 4/2009 | Yamazaki et al. |
| 2009/0171500 A1 | 7/2009 | Matsumoto et al. |
| 2010/0137063 A1 | 6/2010 | Shirakawa et al. |
| 2010/0224420 A1 | 9/2010 | Miyanaga |
| 2010/0245236 A1 | 9/2010 | Takayama |
| 2010/0265173 A1 | 10/2010 | Matsunaga |
| 2011/0074665 A1 | 3/2011 | Konishi |
| 2011/0077088 A1 | 3/2011 | Hayashi et al. |
| 2011/0077899 A1 | 3/2011 | Hayashi et al. |

FOREIGN PATENT DOCUMENTS

| | | |
|---|---|---|
| DE | 297 12 785 | 1/1998 |
| DE | 20 2004 021 792 | 5/2011 |
| DE | 20 2004 021 793 | 5/2011 |
| EP | 0 275 665 | 7/1988 |
| EP | 0 299 738 | 1/1989 |
| EP | 0 335 045 | 10/1989 |
| EP | 0 519 836 | 12/1992 |
| EP | 1 043 746 | 10/2000 |
| EP | 1 120 083 | 8/2001 |
| EP | 1 257 599 | 8/2001 |
| EP | 1 870 141 | 12/2007 |
| FR | 2 472 929 | 7/1981 |
| FR | 2 587 611 | 3/1987 |
| FR | 2 604 910 | 4/1988 |
| FR | 2 647 331 | 11/1990 |
| FR | 2 792 182 | 10/2000 |
| FR | 2 801 490 | 6/2001 |
| FR | 2 811 753 | 1/2002 |
| FR | 2 906 365 | 3/2008 |
| GB | 1 209 954 | 10/1970 |
| GB | 2 288 550 | 10/1995 |
| JP | 44-23551 | 10/1969 |
| JP | 55-95758 | 12/1978 |
| JP | 54-73689 | 6/1979 |
| JP | 55-113472 | 9/1980 |
| JP | 55-113473 | 9/1980 |
| JP | 55-125369 | 9/1980 |
| JP | 55-149822 | 11/1980 |
| JP | 55-152431 | 11/1980 |
| JP | 60-79460 | 6/1985 |
| JP | 60-153159 | 10/1985 |
| JP | 61-154689 | 7/1986 |
| JP | 62-34016 | 2/1987 |
| JP | 63-158311 | 10/1988 |
| JP | 63-163855 | 10/1988 |
| JP | 63-193003 | 12/1988 |
| JP | 02-102651 | 4/1990 |
| JP | 2-238327 | 9/1990 |
| JP | 3-25325 | 2/1991 |
| JP | 3-103272 | 4/1991 |
| JP | 03-107959 | 11/1991 |
| JP | 6-063198 | 3/1994 |
| JP | 6-282373 | 10/1994 |
| JP | 7-213741 | 8/1995 |
| JP | 7-213745 | 8/1995 |
| JP | 7-241281 | 9/1995 |
| JP | 7-241282 | 9/1995 |
| JP | 7-302161 | 11/1995 |
| JP | 8-43182 | 2/1996 |
| JP | 08-131594 | 5/1996 |
| JP | 08-182774 | 7/1996 |
| JP | 8-182774 | 7/1996 |
| JP | 08-184474 | 7/1996 |
| JP | 8-184474 | 7/1996 |
| JP | 8-215176 | 8/1996 |
| JP | 08-244691 | 9/1996 |
| JP | 2576247 | 1/1997 |
| JP | 9-120464 | 5/1997 |
| JP | 9-168529 | 6/1997 |
| JP | 9-197951 | 7/1997 |
| JP | 9-305099 | 11/1997 |
| JP | 11-309270 | 11/1999 |
| JP | 2000-146679 | 5/2000 |
| JP | U3068681 | 5/2000 |
| JP | U3069287 | 6/2000 |
| JP | 2000-254348 | 9/2000 |
| JP | 3172738 | 6/2001 |
| JP | 2001-178845 | 7/2001 |
| JP | 2001-286451 | 10/2001 |
| JP | 2002-112984 | 4/2002 |
| JP | 2002-157081 | 5/2002 |
| JP | 2002-253534 | 9/2002 |
| JP | 2003-79599 | 3/2003 |
| JP | 2003-235834 | 8/2003 |
| JP | 2003280807 | 10/2003 |
| JP | 3722678 | 11/2005 |
| JP | 2005-334083 | 12/2005 |
| JP | 3773455 | 5/2006 |
| JP | 2006-167094 | 6/2006 |
| JP | 3818488 | 9/2006 |
| JP | 2006-284539 | 10/2006 |
| JP | U3128216 | 12/2006 |
| JP | 2008-49117 | 3/2008 |
| JP | 2008071300 | 3/2008 |
| JP | 2008264195 | 11/2008 |
| WO | WO 91/11221 | 8/1991 |
| WO | WO 92/12768 | 8/1992 |
| WO | WO 98/40843 | 9/1998 |
| WO | WO 00/12041 | 3/2000 |
| WO | WO 00/57387 | 9/2000 |
| WO | WO 00/69523 | 11/2000 |
| WO | WO 02/29375 | 4/2002 |
| WO | WO 02/057885 | 7/2002 |
| WO | WO 2004/051201 | 6/2004 |
| WO | WO 2004/053629 | 6/2004 |
| WO | WO 2005/043322 | 5/2005 |
| WO | WO 2008/099582 | 8/2008 |

OTHER PUBLICATIONS

Baek, Seongmin, et al., "Motion Evaluation for VR-based Motion Training," Eurographics 2001, vol. 20, No. 3, 2001.

Biodex Medical Systems, Inc.—Balance System SD Product Information—http://www.biodex.com/rehab/balance/balance_300feat.htm.

Chen, I-Chun, et al., "Effects of Balance Training on Hemiplegic Stroke Patients," Chang Gung Medical Journal, vol. 25, No. 9, pp. 583-590, Sep. 2002.

Dingwell, Jonathan, et al., "A Rehabilitation Treadmill with Software for Providing Real-Time Gait Analysis and Visual Feedback," Transactions of the ASME, Journal of Biomechanical Engineering, 118 (2), pp. 253-255, 1996.

Geiger, Ruth Ann, et al., "Balance and Mobility Following Stroke: Effects of Physical Therapy Interventions With and Without Biofeedback/Forceplate Training," Physical Therapy, vol. 81, No. 4, pp. 995-1005, Apr. 2001.

Harikae, Miho, "Visualization of Common People's Behavior in the Barrier Free Environment," Graduate Thesis—Master of Computer Science and Engineering in the Graduate School of the University of Aizu, Mar. 1999.

Hodgins, J.K., "Three-Dimensional Human Running," Proceedings: 1996 IEEE International Conference on Robotics and Automation, vol. 4, Apr. 1996.

Kim, Jong Yun, et al., "Abstract—A New VR Bike System for Balance Rehabilitation Training," Proceedings: 2001 IEEE Seventh International Conference on Virtual Systems and Multimedia, Oct. 2001.

McComas, Joan, et al., "Virtual Reality Applications for Prevention, Disability Awareness, and Physical Therapy Rehabilitation in Neurology: Our Recent Work," School of Rehabilitation Sciences, University of Ottawa—Neurology Report, vol. 26, No. 2, pp. 55-61, 2002.

NeuroCom International, Inc.—Balance Manager Systems/Products—http://resourcesonbalance.com/neurocom/products/index.aspx.

(56) References Cited

OTHER PUBLICATIONS

NeuroCom International, Inc.—Neurogames—http://resourcesonbalance.com/neurocom/products/NeuroGames.aspx.
Nicholas, Deborah S, "Balance Retraining After Stroke Using Force Platform Feedback," Physical Therapy, vol. 77, No. 5, pp. 553-558, May 1997.
Nintendo Co., Ltd.—Aerobic Exercise Rhythm Boxing—http://www.nintendo.co.jp/wii/rfnj/training/aerobics/aerobics07.html.
Redfern, Mark, et al., "Visual Influences of Balance," Journal of Anxiety Disorders, vol. 15, pp. 81-94, 2001.
Sackley, Catherine, "Single Blind Randomized Controlled Trial of Visual Feedback After Stroke: Effects on Stance Symmetry and Function," Disavility and Rehabilitation, vol. 19, No. 12, pp. 536-546, 1997.
Tossavainen, Timo, et al., "Postural Control as Assessed with Virtual Reality," Acta Otolaryngol, Suppl 545, pp. 53-56, 2001.
Tossavainen, Timo, et al., "Towards Virtual Reality Simulation in Force Platform Posturography," MEDINFO, pp. 854-857, 2001.
Tsutsuguchi, Ken, et al., "Human Walking Animation Based on Foot Reaction Force in the Three-Dimensional Virtual World," The Journal of Visualization and Computer Animation, vol. 11, pp. 3-16, 2000.
Wong, Alice, et al., "The Devlopment and Clinical Evaluation of a Standing Biofeedback Trainer," Journal of Rehabilitation Research and Development, vol. 34, No. 3, pp. 322-327, Jul. 1997.
Yang, Ungyeon, et al., "Implementation and Evaluation of 'Just Follow Me': An Immersive, VR-Based, Motion-Training System," Presence, vol. 11, No. 3, pp. 304-323, 2002.
Interface, Inc.—Advanced Force Measurement—SM Calibration Certificate Installation Information, 1984.
Hugh Stewart, "Isometric Joystick: A Study of Control by Adolescents and Young Adults with Cerebral Palsy," The Australian Occupational Therapy Journal, Mar. 1992, vol. 39, No. 1, pp. 33-39.
Raghavendra S. Rao, et al., "Evaluation of an Isometric and a Position Joystick in a Target Acquisition Task for Individuals with Cerebral Palsy," IEEE Transactions on Rehabilitation Engineering, vol. 8, No. 1, Mar. 2000, pp. 118-125.
D. Sengupta, et al., "Comparative Evaluation of Control Surfaces for Disabled Patients,"Proceedings of the 27th Annual Conference on Engineering in Medicine and Biology, vol. 16, Oct. 6-10, 1974, p. 356.
Ian Bogost, "The Rhetoric of Exergaming,"The Georgia Institute of Technology, 9 pages (date unknown).
Ludonauts, "Body Movin'," May 24, 2004, http://web.archive.org/web/20040611131903/http:/www.ludonauts.com; retrieved Aug. 31, 2010, 4 pages.
Atari Gaming Headquarters—AGH's Atari Project Puffer Page, http://www.atarihq.com/othersec/puffer/index.html, retrieved Sep. 19, 2002, 4 pages.
Michael Antonoff, "Real estate is cheap here, but the places you'd most want to visit are still under construction," Popular Science, Jun. 1993, pp. 33-34.
Steve Aukstakalnis and David Blatner, "The Art and Science of Virtual Reality—Silicon Mirage," 1992, pp. 197-207.
Electronics, edited by Michael Antonoff, "Video Games—Virtual Violence: Boxing Without Bruises," Popular Science, Apr. 1993, p. 60.
Stuart F. Brown, "Video cycle race," Popular Science, May 1989, p. 73.
Scanning the Field for Ideas, "Chair puts Player on the Joystick," Machine Design, No. 21, Oct. 24, 1991, XP 000255214, 1 page.
Francis Hamit, "Virtual Reality and the Exploration of Cyberspace," University of MD Baltimore County, 1993, 4 pages.
Innovation in Action—Biofeed back Motor Control, Active Leg Press—IsoLegPress, 2 pages (date unknown).
Ric Manning, "Videogame players get a workout with the Exertainment," The Gizmo Page from the Courier Journal Sep. 25, 1994, 1 page.
Tech Lines, Military—Arcade aces and Aviation—Winging it, Popular Mechanics, Mar. 1982, p. 163.
Sarju Shah, "Mad Catz Universal MC2 Racing Wheel: Mad Catz MC2 Universal," Game Spot, posted Feb. 18, 2005, 3 pages.
Joe Skorupa, "Virtual Fitness," Sports Science, Popular Mechanics, Oct. 1994, 3 pages.
AGH Musuem—Suncom Aerobics Joystick; http://atarihq.com/museum/2678/hardware/aerobics.html, (retrieved date unknown) 1 page.
Nintendo Zone—The History of Nintendo (1889-1997), retrieved Aug. 24, 1998 pp. 1, 9-10.
The Legible City, Computergraphic Installation with Dirk Groeneveld, Manhattan version (1989), Amsterdam version (1990), Karlsruhe version (1991), 3 pages.
The New Exertainment System. It's All About Giving Your Members Personal Choices, Life Fitness, Circle Reader Service Card No. 28, 1995, 1 page.
The Race Begins with $85, Randal Windracer, Circle Reader Service Card No. 34, 1990, 1 page.
Universal S-Video/Audio Cable; Product #5015, MSRP 9.99; http://www.madcatz.com/Default.asp?Page=133&CategoryImg=Universal_Cables, retrieved May 12, 2005, 1 page.
Tom Dang, et al., "Interactive Video Exercise System for Pediatric Brain Injury Rehabilitation," Assistive Technology Research Center, Rehabilitation Engineering Service, National Rehabilitation Hospital, Proceedings of the RESNA 20th Annual Conference, Jun. 1998, 3 pages.
Linda S. Miller, "Upper Limb Exerciser," Biometrics Ltd—Unique Solutions for Clinical and Research Applications, 6 pages (date unknown).
Raymond W. McGorry, "A system for the measurement of grip forces and applied moments during hand tool use," Liberty Mutual Research Center for Safety and Health, Applied Ergonomics 32 (2001) 271-279.
NordicTrack's Aerobic Cross Trainer advertisment as shown in "Big Ideas—For a Little Money: Great Places to Invest $1,000 or Less," Kiplinger's Personal Finance Magazine, Jul. 1994, 3 pages.
Maurice R. Masliah, "Measuring the Allocation of Control in 6 Degree of Freedom Human-Computer Interaction Tasks," Graduate Department of Mechanical and Industrial Engineering, University of Toronto, 2001, 177 pages.
Leigh Ann Roman, "Boing! Combines Arcade Fun with Physical Training," Memphis—Health Care News: Monitoring the Pulse of Our Health Care Community, Sep. 20, 1996, One Section, 1 page.
"No More Couch Potato Kids," as shown in Orange Coast, Sep. 1994, p. 16.
Gary L. Downey, et al., "Design of an Exercise Arcade for Children with Disabilities," Resna, Jun. 26-30, 1998, pp. 405-407.
Frank Serpas, et al., "Forward-dynamics Simulation of Anterior Cruciate Ligament Forces Developed During Isokinetic Dynamometry," Computer Methods in Biomechanics and Biomedical Engineering, vol. 5 (1), 2002, pp. 33-43.
Carolyn Cosmos, "An 'Out of Wheelchair Experience'", The Washington Post, May 2, 2000, 3 pages.
"Look Ma! No Hands!", The Joyboard—Power Body Control, (date unknown).
David H. Ahl, "Controller update," Creative Computing, vol. 9, No. 12, Dec. 1983, p. 142.
Ian Bogost, "Water Cooler Games—The Prehistory of Wii Fit," Videogame Theory, Criticism, Design, Jul. 15, 2007, 2 pages.
Jeremy Reimer, "A history of the Amiga, part 2: The birth of Amiga," last updated Aug. 12, 2007, 2 pages.
The Amiga Joyboard (1982) image, Photos: Fun with plastic—peripherals that changed gaming; http://news.cnet.com/2300-27076_3-10001507-2.html (retrieved Jul. 23, 2010), 1 page.
The Amiga Power System Joyboard, Amiga history guide, http://www.amigahistory.co.uk/joyboard.html (retrieved Jul. 23, 2010), 2 pages.
"Joyboard," Wikipedia—The free encyclopedia, http://en.wikipedia.org/wiki/Joyboard (retrieved Jul. 26, 2010), 2 pages.
"Dance Dance Revolution," Wikipedia—the free encyclopedia, http://en.wikipedia.org/wiki/Dance Dance Revolution (retrieved Jul. 23, 2010), 9 pages.
"Cure for the couch potato," Kansas City Star (MO), Jan. 2, 2005, WLNR 22811884, 1 page.

(56) References Cited

OTHER PUBLICATIONS

JC Fletcher, "Virtually Overlooked: The Power Pad games," Joystiq, http://www.joystiq.com/2007/09/20/virtually-overlooked-the-power-pad-games/ (retrieved Jul. 26, 2010), 3 pages.
Family Fun Fitness, Nintendo Entertainment System, BANDAI, (date unknown).
"Power Pad/Family Fun and Fitness/Family Trainer," http://www.gamersgraveyard.com/repository/nes/peripherals/powerpad.html (retrieved Jul. 26, 2010), 2 pages.
"Power Pad Information," Version 1.0 (Sep. 23, 1999) http://www.gamersgraveyard.com/repository/nes/peripherals/powerpad.txt (retrieved Jul. 26, 2010), 2 pages.
Wii+Power+Pad.jpg (image), http://bpl.blogger.com/_J5LEiGp54I/RpZbNpnLDgl/AAAAAAAAAic/Gum6DD3Umjg/s1600-11/Wii+Power+Pad.jpg (retrieved Jul. 26, 2010), 1 page.
Vs. Slalom—Videogame by Nintendo, KLOV—Killer List of Video Games, http://www.arcade-museum.com/game_detail.php?game_id=10368 (retrieved Jul. 26, 2010), 3 pages.
"Nintendo Vs. System," Wikipedia—the free encyclopedia, http://en.wikipedia.org/wiki/Nintendo_Vs._System (retrieved Jul. 26, 2010), 3 pages.
Vs. Slalom—Step Up to the Challenge, Nintendo, (date unknown).
Vs. Slalom—Live the Thrill, Nintendo, (date unknown).
Vs. Slalom—Operation Manual, MDS(MGS), Nintendo, 4 pages, (date unknown).
HyperspaceArcade.com—Specialists in Arcade Video Game Repair and Restoration, http://www.hyperspacearcade.com/VSTypes.html (retrieved Jul. 3, 2010), 3 pages.
Vs. Slalom—Attachment Pak Manual; for Installation in: VS. UniSystem (Upright) and VS. DualSystem (Upright), TM of Nintendo of America Inc., 1986, 15 pages.
Leiterman, "Project Puffer: Jungle River Cruise," Atari, Inc., 1982, 2 pages.
Leiterman, "Project Puffer: Tumbleweeds," Atari, Inc., 1982, 1 page.
Jerry Smith, "Other Input Devices," Human Interface Technology Laboratory, 2 pages, (date unknown).
Trevor Meers, "Virtually There: VR Entertainment Transports Players to Entrancing New Worlds," Smart Computing, vol. 4, Issue 11, Nov. 1993, 6 pages.
"Dance Aerobics," Moby Games, Feb. 12, 2008, 2 pages.
"Hard Drivin'," KLOV—Killer List of Video Games, The International Arcade Museum, http://www.arcade-museum.com, 6 pages, (date unknown).
"The World's First Authentic Driving Simulation Game!", Hard Drivin'—Get Behind the Wheel and Feel the Thrill (image), Atari games Corporation, 1 page, (date unknown).
Electronic Entertainment Expo (E3) Overview, Giant Bomb—E3 2004 (video game concept), http://www.giantbomb.com/e3-2004/92-3436/ (retrieved Sep. 3, 2010), 3 pages.
Guang Yang Amusement, Product Name: Live Boxer, 1 page, (date unknown).
Family Fun Fitness: Basic Set (Control Mat and Athletic World Game Pak), Nintendo Entertainment System, Bandai, (date unknown).
Roll & Rocker (image), 1 page, (date unknown).
Roll & Rocker, Enteractive (image), 2 pages, (date unknown).
Michael Goldstein, "Revolution on Wheels—Thatcher Ulrich," Nov.-Dec. 1994, 3 pages.
"Playboy on the Scene: Ride On!", 1 page, (date unknown).
Candace Putnam, "Software for Hardbodies: A virtual-reality hike machine takes you out on the open road," Design, 1 page, (date unknown).
Rachel, "No-Sweat Exercise—Can you get healthier without really trying?" Fitness, 1 page, (date unknown).
Fitness article, Sep. 1994, p. 402-404.
"Wired Top 10: Best Selling Toys in Jun. 1994," Wired Sep. 1994, 1 page.
"Top Skater," Sega Amusements U.S.A, Inc, 1 page, (date unknown).
Katharine Alter, et al., "Video Games for Lower Extremity Strength Training in Pediatric Brain Injury Rehabilitation," National Rehabilitation Hospital, 18 pages, (date unknown).
Cateye Recumbent GameBike Pro: Latest Technology in Exercise Bikes, beyondmoseying.com High Performance Exercise Equipment, 2 pages (advertisement; no date).
Fitness Fun, while Exercising and Getting Fit for Kids, Teens and Adults, (advertisement, no date).
Warranty Information and Your Joyboard: How it Works, Amiga Corporation, date unknown, 2 pages.
Complaint for Patent Infringement, *IA Labs CA, LLC v. Nintendo Co., Ltd. and Nintendo of America, Inc.*, United States District Court for the District of Maryland Northern Division (Apr. 2, 2010), 317 pages.
Plaintiff IA Labs CA, LLC's Opening Claim Construction Brief, *IA Labs CA, LLC v. Nintendo Co., Ltd. and Nintendo of America, Inc.*, United States District Court for the District of Maryland Southern Division (Dec. 13, 2010), 36 pages.
Nintendo Co., Ltd. and Nintendo of America Inc.'s Opening Claim Construction Brief, *IA Labs CA, LLC v. Nintendo Co., Ltd. and Nintendo of America, Inc.*, United States District Court for the District of Maryland Southern Division (Dec. 13, 2010), 55 pages.
Plaintiff IA Labs CA, LLC's Response Claim Construction Brief, *IA Labs CA, LLC v. Nintendo Co., Ltd. and Nintendo of America, Inc.*, United States District Court for the District of Maryland Southern Division (Jan. 6, 2011), 49 pages.
Nintendo Co., Ltd. and Nintendo of America Inc.'s Closing Claim Construction Brief, *IA Labs CA, LLC v. Nintendo Co., Ltd. and Nintendo of America, Inc.*, United States District Court for the District of Maryland Southern Division (Jan. 6, 2011), 25 pages.
Expert Report of Lee Rawls, Nov. 2, 2010, 37 pages (redacted).
Nintendo Co., Ltd. and Nintendo of America'S Opposition to IA Labs CA, LLC's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), including the Appendix of Exhibits and Exhibits A-R, 405 pages.
Declaration of R. Lee Rawls in Support o Nintendo Co., Ltd. and Nintendo of America Inc.'s Opposition to IA Labs CA. LLC's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), including Exhibits 1, 3-12, 193 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), 7 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd, et al.*, (Defendant), United States District Court for the District of Maryland Southern Division (May 16, 2011), Appendix of Exhibits, 2 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 1, 36 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 2, 40 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 3, 85 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA*

(56) References Cited

OTHER PUBLICATIONS

*Labs CA, LLC*, (Plaintiff) v. *Nintendo Co., Ltd. et al.*, (Defendant), United States District Court for the District of Maryland Southern Division (May 16, 2011), Exhibit 4, 10 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 5, 9 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd, et al.*, (Defendant), United States District Court for the District of Maryland Southern Division (May 16, 2011), Exhibit 6, 17 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 7, 16 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 8, 45 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 9, 4 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 10, 22 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 11, 27 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 12, 3 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 13, 7 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 14, 22 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 15, 45 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 16, 42 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 17, 19 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 18, 27 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 19, 13 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 20, 29 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 21, 25 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 22, 11 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 23, 20 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 24, 7 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 25, 80 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 26, 32 pages.
Trademark U.S. Appl. No. 74/402,755, filed Jun. 14, 1993, 43 pages.
"AccuSway Dual Top: For Balance and Postural Sway Measurement," AMTI: Force and Motion, ISO 9001:2000, 2 pages.
Borzelli G., Cappozzo A., and Papa E., "Inter- and intra-individual variability of ground rejection forces during sit-to-stand with principal component analysis," Medical Engineering & Physics 21 (1999), pp. 235-240.

(56) References Cited

OTHER PUBLICATIONS

Chiari L., Cappello A., Lenzi D., and Della Croce U, "An Improved Technique for the Extraction of Stochasitc Parameters from Stabilograms," Gait and Posture 12 (2000), pp. 225-234.
Cutlip R., Hsiao H., Garcia R., Becker E., Mayeux B., "A comparison of different postures for scaffold end-frame disassembly," Applied Ergonomics 31 (2000), pp. 507-513.
Davis K.G., Marras W.S., Waters T.R., "Evaluation of spinal loading during lowering and lifting," The Ohio State University, Biodynamics Laboratory, Clinical Biomechanics vol. 13, No. 3, 1998 pp. 141-152.
Rolf G. Jacob, Mark S. Redfern, Joseph M. Furman, "Optic Flow-induced Sway in Anxiety Disorders Associated with Space and Motion Discomfort," Journal of Anxiety Disorders, vol. 9, No. 5, 1995, pp. 411-425.
Jorgensen M.J., Marras W.S., "The effect of lumbar back support tension on trunk muscle activity," Clinical Biomechanics 15 (2000), pp. 292-294.
Deborah L. King and Vladimir M. Zatsiorsky, "Extracting gravity line displacement from stabilographic recordings," Gait & Posture 6 (1997), pp. 27-38.
Kraemer W.J., Volek J.S., Bush J.A., Gotshalk L.A., Wagner P.R., Gómez A.L., Zatsiorsky V.M., Duzrte M., Ratamess N.A., Mazzetti S.A., Selle B.J., "Influence of compression hosiery on physiological responses to standing fatigue in women," The Human Performance Laboratory, Medical & Science in Sports & Exercise, 2000, pp. 1849-1858.
Papa E. and Cappozzo A., "A telescopic inverted-pendulum model of the musculo-skeletal system and its use for the analysis of the sit-to-stand motor task," Journal of Biomechanics 32 (1999), pp. 1205-1212.
Balance System, BalanceTrak 500, & Quantrem, ZapConnect.com: Medical Device Industry Portal, http://www.zapconnect.com/products/index/cfm/fuseaction/products, 2 pages. (Retrieved Apr. 5, 2011).
BERTEC: Dominate Your Field, Physician's Quick Guide, Version 1.0.0, Feb. 2010, 13 pages.
BERTEC: Dominate Your Field, Balancecheck Screener, Version 1.0.0, Feb. 2010, 35 pages.
BERTEC: Dominate Your Field, Balancecheck Trainer, Version 1.0.0, Feb. 2010, 37 pages.
BERTEC Corporation—Balancecheck Standard Screener Package, http://bertec.com/products/balance-systems/standard-screener.html, 1 page. (Retrieved Apr. 12, 2011).
BERTEC Corporation—Balance Systems: Balancecheck Advanced balance assessment & training products for the balance professional, http://bertec.com/products/balance-systems.html, 1 page. (Retrieved Mar. 31, 2011).
BERTEC Corporation—Balancecheck Mobile Screener Package: Portable balance screening with full functionality, http://bertec.com/products/balance-systems/mobile-screener.html, 1 page. (Retrieved Mar. 31, 2011).
BERTEC Corporation—Balancecheck Standard Screener & Trainer Package: Advanced balance screening and rehabilitation system, http://bertec.com/products/balance-systems/standard-screener-trainer.html, 1 page. (Retrieved Mar. 31, 2011).
Trademark U.S. Appl. No. 75/136,330, filed Jul. 19, 1996, 47 pages.
BERTEC: Dominate Your Field, Digital Acquire 4, Version 4.0.10, Mar. 2011, 22 pages.
BERTEC: Dominate Your Field, Bertec Force Plates, Version 1.0.0, Sep. 2009, 31 pages.
BERTEC: Dominate Your Field, Product Information: Force Plate FP4060-08:Product Details and Specifications, 4 pages.
BERTEC: Dominate Your Field, Product Information: Force Plate FP4060-10:Product Details and Specifications, 2 pages.
Trademark U.S. Appl. No. 73/542,230, filed Jun. 10, 1985, 52 pages.
Brent L. Arnold and Randy J. Schmitz, "Examination of Balance Measures Produced by the Biodex Stability System," Journal of Athletic Training, vol. 33(4), 1998, pp. 323-327.
Trademark Registration No. 1,974,115 filed Mar. 28, 1994, 8 pages.
ICS Balance Platform, Fall Prevention: Hearing Assessment, Fitting Systems, Balance Assessment, Otometrics: Madsen, Aurical, ICS, 2 pages.
Trademark U.S. Appl. No. 75/471,542, filed Apr. 16, 1998, 102 pages.
VTI Force Platform, Zapconnect.com: Medical Device Industry Portal, http://zapconnect.com/products/index.cfm/fuseaction/products, 2 pages. (Retrieved Apr. 5, 2011).
Amin M., Girardi M., Konrad H.R., Hughes L., "A Comparison of Electronystagmorgraphy Results with Posturography Findings from the BalanceTrak 500," Otology Neurotology, 23(4), 2002, pp. 488-493.
Girardi M., Konrad H.R., Amin M , Hughes L.F., "Predicting Fall Risks in an Elderly Population: Computer Dynamic Posturography Versus Electronystagmography Test Results," Laryngoscope, 111(9), 2001, 1528-32.
Dr. Guido Pagnacco, Publications, 1997-2008, 3 pages.
College of Engineering and Applied Science: Electrical and Computer Engineering, University of Wyoming, Faculty: Guido Pagnacco, http://wwweng.uwyo.edu/electrical/faculty/Pagnacco.html, 2 pages. (Retrieved Apr. 20, 2011).
EyeTracker, IDEAS, DIFRA, 501(k) Summary: premarket notification, Jul. 5, 2007, 7 pages.
Vestibular technologies, copyright 2000-2004, 1 page.
Scopus preview—Scopus—Author details (Pagnacco, Guido), http:www.scopus.com/authid/detail.url?authorId=6603709393, 2 pages. (Retrieved Apr. 20, 2011).
Vestibular Technologies Company Page, "Vestibular technologies: Helping People Regain their Balance for Life," http:www.vestibtech.com/AboutUs.html, 2 pages. (Retrieved Apr. 20, 2011).
GN Otometrics Launces ICS Balance Platform: Portable system for measuring postural sway, http://audiologyonline.com/news/pf_news_detail.asp?news_id=3196, 1 page. (Retrieved Mar. 31, 2011).
Trademark U.S. Appl. No. 75/508,272, filed Jun. 25, 1998, 36 pages.
Trademark U.S. Appl. No. 75/756,991, filed Jul. 21, 1999, 9 pages.
Trademark U.S. Appl. No. 76/148,037, filed Oct. 17, 2000, 78 pages.
Vestibular technologies, VTI Products: BalanceTRAK User's Guide, Preliminary Version 0.1, 2005, 34 pages.
Trademark U.S. Appl. No. 76/148,037, filed Oct. 17, 2000, 57 pages.
Vestibular Technologies, Waybackmachine, http://vestibtech.com/balancetrak500.html, 7 pages. (Retrieved Mar. 30, 2011).
Vestibular Technologies, 2004 Catalog, 32 pages.
The Balance Trak 500—Normative Data, 8 pages.
State of Delaware: The Official Website of the First State, Division of Corporations—Online Services, http://delecorp.delaware.gov/tin/controller, 2 pages. (Retrieved Mar. 21, 2011).
Memorandum in Support of Plaintiff IA Labs' Motion for Partial Summary Judgment on Defendants' Affirmative Defense and Counterclaim That U.S. Patent No. 7,121,982 is Invalid Under 35 U.S.C. §§ 102 and 103, *IA Labs CA, LLC*, (Plaintiff) v. *Nintendo Co., Ltd. et al.*, (Defendant), United States District Court for the District of Maryland Southern Division (Apr. 27, 2011), 17 pages.
"Instructions for 'Wii Family Trainer'," *NAMCO BANDAI Games Inc.*, p. 9, p. 11 (Partial Translation—discussed at p. 1 of the specification).
Search Report (2 pgs.) dated May 27, 2011 issued in German Application No. 20 2004 021 793.7.
Notice of Reasons for Rejection from Japanese Application No. 2009-054979, issued Dec. 10, 2012.

\* cited by examiner

F I G. 1
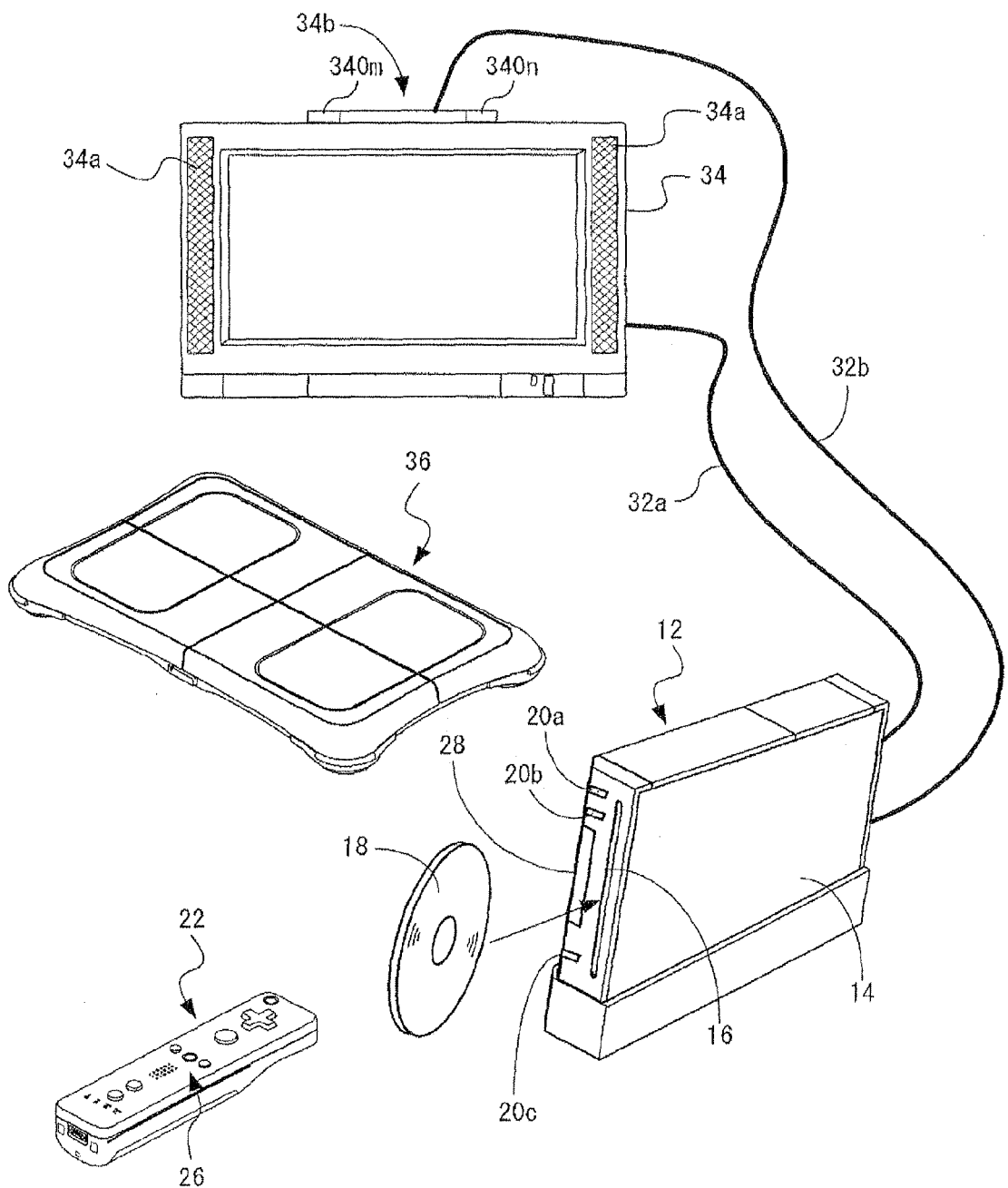

F I G. 4
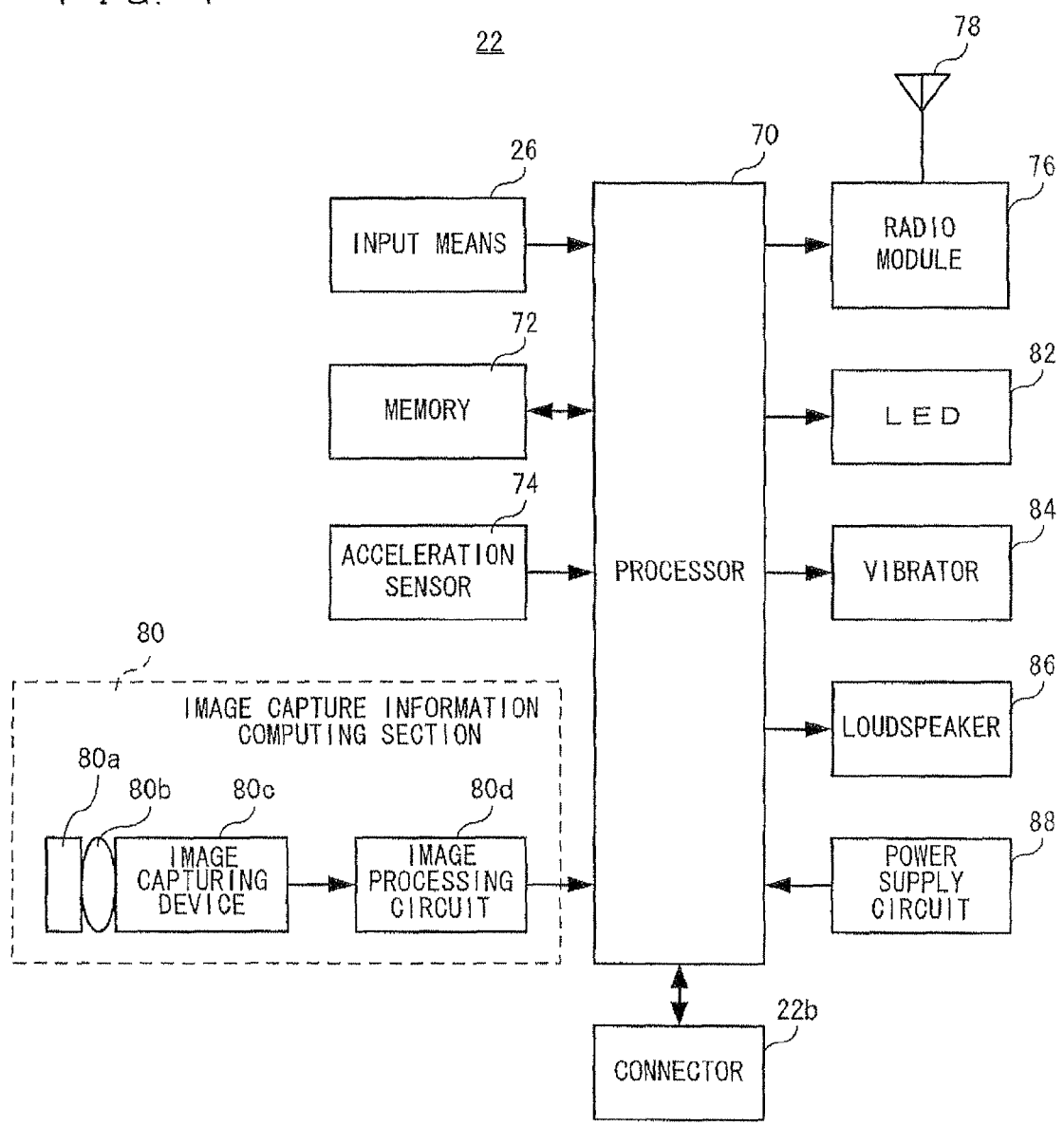

F I G. 5
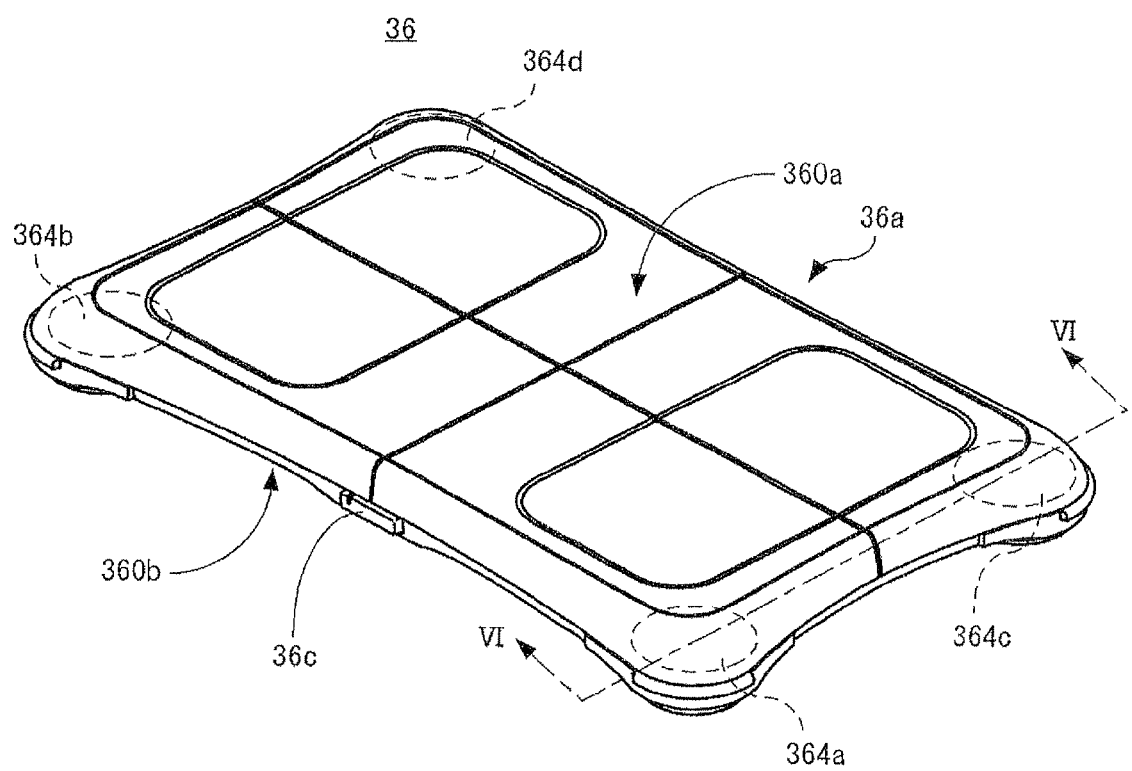

US 8,707,768 B2

COMPUTER READABLE STORAGE MEDIUM STORING INFORMATION PROCESSING PROGRAM AND INFORMATION PROCESSING APPARATUS

CROSS REFERENCE TO RELATED APPLICATION

This Application is a continuation of Ser. No. 12/510,437 filed Jul. 28, 2009, now U.S. Pat. No. 8,079,251 which claims the benefit of Japanese Patent Application No. 2009-054979 filed Mar. 9, 2009, the contents of all of which are herein incorporated by reference.

FIELD

The technology herein relates to a computer readable storage medium storing an information processing program, and an information processing apparatus. More particularly, the technology herein relates to a computer readable storage medium storing an information processing program which performs information processing using an input device including a load detecting means, and an information processing apparatus.

BACKGROUND AND SUMMARY

Conventionally, there is a mat controller which is operated using a foot or feet to play a game. For example, Non-Patent Document 1 ("Instructions for 'Wii Family Trainer'," NAMCO BANDAI Games Inc., p. 9, p. 11) discloses a mat controller including upward, downward, rightward and leftward movement operating buttons for, e.g., selecting items, a decision operating button for deciding (or canceling) an item, and the like. The mat controller is provided with a plurality of buttons corresponding to respective operations arranged at predetermined positions on a mat. The user steps on a button corresponding to a desired operation to perform the operation.

As described above, the mat controller of Non-Patent Document 1 is provided with a plurality of buttons at predetermined positions on a mat, and is not operated based on a center-of-gravity position on the mat.

Therefore, an object of certain example embodiments is to provide a computer readable storage medium storing an information processing program which applies a load to an input device including a load detecting means and performs a process based on a center-of-gravity position of the load, and an information processing apparatus.

Certain example embodiments have the following features to attain the object mentioned above. Note that reference numerals, additional descriptions and the like inside parentheses in this section indicate correspondence to embodiments described below for the sake of easy understanding, and do not limit the present invention.

An embodiment of the present invention is directed to a computer readable storage medium storing an information processing program executable by a computer (CPU 40) of an information processing apparatus (game apparatus 12) for processing a signal which is based on a load value output from a first input device (load controller 36) including an input surface (platform 36*a*) and a load detecting means (load sensors 364) for detecting the load value applied to the input surface. The program causes the computer to function as a center-of-gravity position detecting means (step S30 of FIG. 17; hereinafter, only step numbers are described), a load value determining means (S9), and a processing means (S33). The center-of-gravity position detecting means detects a center-of-gravity position of a load applied to the input surface of the first input device based on the signal (data indicating the load value or the center-of-gravity position) output from the first input device. The load value determining means determines whether or not the load value applied to the input surface of the first input device is smaller than a predetermined value, based on the signal output from the first input device. The processing means executes a predetermined process based on the center-of-gravity position when a result of the determination by the load value determining means is positive.

According to the embodiment of the present invention, when the magnitude of a load applied to an input portion of the first input device including the load detecting means is smaller than a predetermined value, a process can be performed based on a center-of-gravity position of the load. In other words, when the user stands on the first input device, an input to the first input device by the user is not accepted, and when the user does not stand on the first input device, an input to the first input device by the user is accepted. As a result, it is possible to prevent an operation which is not intended by the user and confusion.

In the embodiment of the present invention, the first input device may output the load value detected by the load detecting means. In this case, the center-of-gravity position detecting means calculates the center-of-gravity position based on the load value detected by the load detecting means. The load value determining means determines whether or not the load value detected by the load detecting means is smaller than the predetermined value.

With this configuration, the information processing apparatus can calculates the center-of-gravity position based on the load value output from the first input device. The information processing apparatus can executes a predetermined process based on the calculated center-of-gravity position.

In the embodiment of the present invention, the processing means may execute one of different processes corresponding to respective areas set on the input surface, depending on in which of the areas the center-of-gravity position is located.

With this configuration, different processes can be executed, depending on the area on the input surface in which the center-of-gravity position is located.

In the embodiment of the present invention, the information processing program may cause the computer to further function as a weight information acquiring means. The weight information acquiring means acquires weight information of a user. Moreover, the load value determining means may include a threshold changing means. The threshold changing means changes the predetermined value based on the weight information of the user. The threshold changing means also determine whether or not the load value is smaller than the predetermined value changed by the threshold changing means. Here, the weight information of the user may be a previously stored user's weight or a weight input by the user.

With this configuration, the threshold for determination of the load value determining means can be changed based on the weight information of the user.

In the embodiment of the present invention, the first input device may include a plurality of load detecting means, and output a plurality of load values detected by the plurality of load detecting means. In this case, the center-of-gravity position detecting means calculates the center-of-gravity position based on the load values detected by the plurality of load detecting means. The load value determining means determines whether or not a sum of the load values detected by the plurality of load detecting means is smaller than the predetermined value.

With this configuration, the center-of-gravity position of a load can be obtained from load values detected by a plurality of load detecting means.

In the embodiment of the present invention, the information processing apparatus may process a signal output from a second input device different from the first input device, in addition to the signal output from the first input device. In this case, the processing means, when the result of the determination by the load value determining means is negative, executes the predetermined process based on the signal output from the second input device.

With this configuration, the user can perform inputting using two input devices, i.e., the first input device and the second input device. Moreover, when the result of determination by the load value determining means is negative, then if a process is executed based on an input to the second input device entered by the user, it is possible to prevent an input which is not intended by the user. As a result, even when two input devices can be used to perform inputting, the user can easily perform an intended operation.

In the embodiment of the present invention, the information processing program may cause the computer to further function as an area setting means (S2). The area setting means sets on the input surface an input area (380, 382) corresponding to an input type of the second input device. The processing means, when the result of the determination by the load value determining means is positive, executes the predetermined process based on an input of the input type corresponding to the input area in which the center-of-gravity position is located.

With this configuration, when the first input device and the second input device can be used to perform inputting, a similar operation can be performed. Specifically, by setting an input area corresponding to an input type of the second input device, the same input type as that which the second input device can be used to input can be input using the first input device.

In the embodiment of the present invention, the information processing program may cause the computer to further function as an operation displaying means (S10). The operation displaying means displays on a display device a display indicating that an operation using the first input device is available, when the result of the determination by the load value determining means is positive.

With this configuration, when an operation using the first input device is effective, a display indicating that the operation is available (a message or an image (e.g., an image indicating which area on the input surface corresponds to which input operation) can be provided. As a result, the user can easily determine whether or not an operation using the first input device is available.

In the embodiment of the present invention, the processing means may execute a menu operation process for selecting and deciding an item as the predetermined process.

With this configuration, the first input device can be used to perform a menu operation.

In the embodiment of the present invention, the information processing program may cause the computer to further function as an area setting means (S2). The area setting means sets a first area (380) including one or more areas and a second area (382) including one or more areas on the input surface of the first input device. The processing means executes a first process (cursor moving process) as the predetermined process when the center-of-gravity position is located in the first area, and executes a second process (item deciding process) as the predetermined process when the center-of-gravity position is located in the second area.

With this configuration, the user can perform different processes (the first and second processes) using the first input device.

In the embodiment of the present invention, the area setting means may set the second area to be narrower than the first area.

With this configuration, the user can cause the computer to more easily execute the second process than the first process. As a result, satisfactory operability is obtained even when an input operation is performed using the first input device.

In the embodiment of the present invention, the area setting means may set a distance between a predetermined position on the input surface and the second area to be longer than a distance between the predetermined position and the first area.

With this configuration, the user can cause the computer to more easily perform the first process than the second process.

In the embodiment of the present invention, the area setting means may further set a third area (invalid input area) on the input surface. In this case, the processing means executes the predetermined process when the center-of-gravity position is located in the first area or the second area, and does not execute the predetermined process when the center-of-gravity position is located in the third area.

With this configuration, an invalid input area can be set on the input surface. As a result, when the center-of-gravity position is located in the third area, an input by the first input device can be caused to be invalid.

In the embodiment of the present invention, the processing means may execute as the first process a process of moving a cursor used to select an item, and execute as the second process a process (decision of an item, transition of screens, etc.) including a process of deciding the item selected by the cursor.

With this configuration, the user can perform a process of moving a cursor, a process of deciding an item selected by the cursor, and the like, using the first input device.

In the embodiment of the present invention, the area setting means may set as the third area a boundary between each area included in the first area and the second area.

With this configuration, the user can easily perform an operation based on each area. Specifically, by setting the third area between each area of the first area and the second area, the areas can be clearly distinguished from each other, thereby making it possible to prevent the user from entering an erroneous input.

In the embodiment of the present invention, the area setting means may set the third area at a center portion of the input surface, the first area above, below, to the right of, and to the left of the third area in the shape of a cross, and the second area in oblique directions of the third area.

With this configuration, the user can use the first input device to perform an input operation similar to a cross-key operation or a button operation which is performed using a conventional controller held by a hand.

According to the embodiment of the present invention, even when an operation is performed by applying a load to an input device including a load detecting means, the user can easily perform a desired operation. Specifically, only when the user does not stand on the input device, an input from the input device is accepted. As a result, it is possible to prevent an operation which is not intended by the user and confusion.

These and other objects, features, aspects and advantages of certain example embodiments will become more apparent from the following detailed description when taken in conjunction with the accompanying drawings.

BRIEF DESCRIPTION OF THE DRAWINGS

FIG. 1 is an external view of a game system according to an example;

FIG. 4 is a block diagram showing an electrical configuration of the controller 22;

FIG. 5 is a perspective external view of a load controller 36 of FIG. 1;

FIG. 13 is a diagram showing input areas in a coordinate space corresponding to respective operation areas of the platform 36a;

Figure 2:
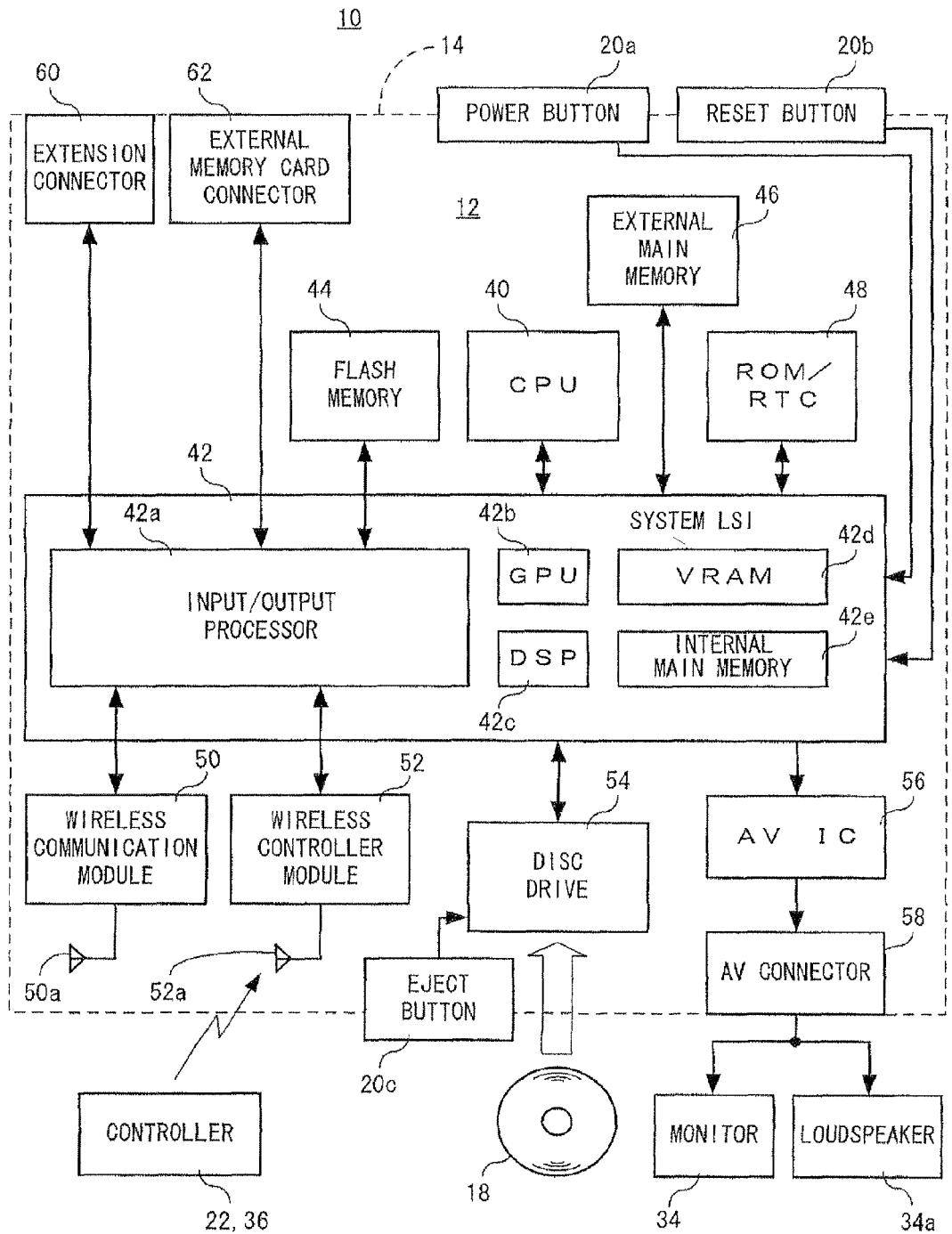
FIG. 2 is a block diagram showing an electrical configuration of a video game system 10 of this example.

DETAILED DESCRIPTION (Overall Configuration of Game System)

Next, an example will be described with reference to the accompanying drawings. FIG. 1 is an external view of a game system according to the example of the present invention. The game system 10 includes a game apparatus 12, a controller 22, and a load controller 36. Note that, the game apparatus 12 of this example is designed to communicate with up to four controllers (22, 36), though not shown. Also, the game apparatus 12 and each controller (22, 36) are connected via wireless communication. For example, the wireless communication is executed in accordance with the Bluetooth® standard, or alternatively, may be executed in accordance with other standards, such as infrared, wireless LAN or the like.

The game apparatus 12 includes a housing 14 in the shape of substantially a rectangular parallelepiped. A disc slot 16 is provided in a front surface of the housing 14. An optical disc 18 which is an exemplary information storage medium storing a game program or the like is inserted and loaded through the disc slot 16 into a disc drive 54 (see FIG. 2) in the housing 14. An LED and a light guide plate are provided around the disc slot 16 and can be turned ON in response to various processes.

Also, a power button 20a and a reset button 20b are provided in an upper portion of the front surface of the game apparatus 12, and an eject button 20c is provided in a lower portion thereof. Moreover, a connector cover 28 for an external memory card is provided between the reset button 20b and the eject button 20c and in the vicinity of the disc slot 16. A connector 62 for an external memory card (see FIG. 2) is provided inside the external memory card connector cover 28. An external memory card (hereinafter simply referred to as a "memory card" (not shown)) is inserted into the connector 62. The memory card is utilized to load and temporarily store a game program or the like read out from the optical disc 18, or save game data (result data or intermediate data of a game) of a game played using the game system 10. Note that the game data may be saved into, for example, an internal memory, such as a flash memory 44 (see FIG. 2), which is provided in the game apparatus 12, instead of the memory card. Also, the memory card may be used as a backup memory for the internal memory.

Note that, as the memory card, a general-purpose SD card can be used, or alternatively, other general-purpose memory cards, such as a memory stick® and a multimedia card®, can be used.

An AV cable connector 58 (see FIG. 2) is provided in a rear surface of the housing 14 of the game apparatus 12. The AV connector 58 is used to connect a monitor 34 and loudspeakers 34a to the game apparatus 12 via an AV cable 32a. The monitor 34 and the loudspeakers 34a may be typically of a color television set. The AV cable 32a allows a video signal and an audio signal from the game apparatus 12 to be input to a video input terminal and an audio input terminal of the color television, respectively. Therefore, a game image of a three-dimensional (3D) video game is displayed on a screen of the color television (monitor) 34, and stereo game audio, such as game music or sound effects, is output from the right and left loudspeakers 34a. Also, a marker unit 34b including two infrared LEDs (markers) 340m and 340n is provided in the vicinity of the monitor 34 (in this example, an upper portion of the monitor 34). The marker unit 34b is connected via a power supply cable 32b to the game apparatus 12. Therefore, power is supplied from the game apparatus 12 to the marker unit 34b. As a result, the markers 340m and 340n perform light emission and output infrared light toward the front of the monitor 34.

Note that power for the game apparatus 12 is supplied from a typical AC adapter (not shown). The AC adapter is plugged into a standard home wall socket. The game apparatus 12 converts home power supply (commercial power supply) into a low DC voltage signal suitable for driving. In other examples, a battery may be used as a power supply.

In the game system 10, when a user or users desire to play a game (or other applications rather than games), the user initially powers ON the game apparatus 12, and then selects an appropriate optical disc 18 storing a program of a video game (or another application which the user desires to play), and loads the optical disc 18 into the disc drive 54 of the game apparatus 12. In response to this, the game apparatus 12 starts executing the video game or another application based on a program recorded on the optical disc 18. The user operates the controller 22 so as to give an input to the game apparatus 12. For example, by operating any of a plurality of input means 26, the game or another application is started. Also, in addition to operations to the input means 26, by moving the controller 22 itself, a moving image object (user object) can be moved in different directions, or a point of view (camera position) of the user in a 3D game world can be changed.

FIG. 2 is a block diagram showing an electrical configuration of the video game system 10 of this example. Components in the housing 14 are mounted to a printed board, though not shown. As shown in FIG. 2, the game apparatus 12 includes a CPU 40. The CPU 40 functions as a game processor. A system LSI 42 is connected to the CPU 40. An external main memory 46, a ROM/RTC 48, a disc drive 54 and an AV IC 56 are connected to the system LSI 42.

The external main memory 46 stores a program, such as a game program or the like, or various kinds of data, or serves as a work area or a buffer area for the CPU 40. The ROM/RTC 48 is a so-called boot ROM, in which a program for booting the game apparatus 12 is incorporated and a clock circuit for counting time is provided. The disc drive 54 reads out program data, texture data or the like from the optical disc 18, and writes data into an internal main memory 42e (described below) or the external main memory 46 by a control of the CPU 40.

The system LSI 42 includes an input-output processor 42a, a GPU (Graphics Processor Unit) 42b, a DSP (Digital Signal Processor) 42c, a VRAM 42d, and the internal main memory 42e, which are connected to each other via an internal bus (not shown).

The input/output processor (I/O processor) 42a executes transmission/reception or downloading of data. The data transmission/reception or downloading will be described in detail below.

The GPU 42b, which is a part of a drawing means, receives a graphics command (drawing command) from the CPU 40, and generates game image data in accordance with the command. Note that the CPU 40 gives the GPU 42b an image generating program required for generation of the game image data in addition to the graphics command.

The VRAM 42d is connected to the GPU 42b as described above, though not shown. The GPU 42b accesses the VRAM 42d to acquire data (image data: polygon data, texture data, etc.) required for execution of the drawing command. Note that the CPU 40 writes image data required for drawing into the VRAM 42d via the GPU 42b. The GPU 42b access the VRAM 42d to generate game image data for drawing.

Note that it is assumed in this example that the GPU 42b generates game image data. When any application other than game applications is executed, the GPU 42b generates image data for the application.

The DSP 42c, which functions as an audio processor, generates audio data corresponding to sound, speech or music which is to be output from the loudspeakers 34a, using sound data, sound waveform (tone color) data or the like stored in the internal main memory 42e, the external main memory 46 or the like.

The image data and audio data thus generated are read out by the AV IC 56, and are then output via the AV connector 58 to the monitor 34 and the loudspeakers 34a, respectively. Therefore, a game screen is displayed on the monitor 34 while sound (music) required for a game is output from the loudspeakers 34a.

The flash memory 44, a wireless communication module 50, and a wireless controller module 52 as well as an extension connector 60 and the external memory card connector 62 are connected to the input/output processor 42a. An antenna 50a is connected to the wireless communication module 50. An antenna 52a is connected to the wireless controller module 52.

The input/output processor 42a can communicate with other game apparatuses or various servers connected to a network via the wireless communication module 50. Note that the input/output processor 42a can directly communicate with other game apparatuses without via a network. The input/output processor 42a regularly accesses the flash memory 44 to detect the presence or absence of data (transmission data) that needs to be transmitted to the network. If there is the transmission data, the input/output processor 42a transmits the transmission data via the wireless communication module 50 and the antenna 50a to the network. The input/output processor 42a also receives data (received data) transmitted from another game apparatus via the network, the antenna 50a and the wireless communication module 50, and stores the received data into the flash memory 44. Note that, in a certain case, the received data is directly discarded. Moreover, the input/output processor 42a receives data (downloaded data) downloaded from a download server via the network, the antenna 50a and the wireless communication module 50, and stores the downloaded data into the flash memory 44.

The input/output processor 42a also receives input data transmitted from the controller 22 or the load controller 36 via the antenna 52a and the wireless controller module 52, and stores (temporarily stores) the input data into a buffer area of the internal main memory 42e or the external main memory 46. The input data is utilized in a game process performed by the CPU 40 before being erased from the buffer area.

Note that, in this example, as described above, the wireless controller module 52 communicates with the controller 22 and the load controller 36 in accordance with the Bluetooth standard.

In FIG. 2, the controller 22 and the load controller 36 are shown as a single unit for the sake of convenience.

Also, the extension connector 60 and the external memory card connector 62 are connected to the input/output processor 42a. The extension connector 60 is a connector for interface, such as USB or SCSI. A medium (e.g., an external storage medium, etc.) or a peripheral device (e.g., another controller, etc.) can be connected to the extension connector 60. A wired LAN adapter can be connected to the extension connector 60, so that a wired LAN can be used instead of the wireless communication module 50. An external storage medium, such as a memory card or the like, can be connected to the external memory card connector 62. Therefore, for example, the input/output processor 42a can access an external storage medium via the extension connector 60 or the external memory card connector 62 to save or read out data.

As also shown in FIG. 1, the game apparatus 12 (housing 14) is provided with the power button 20a, the reset button 20b, and the eject button 20c. The power button 20a is connected to the system LSI 42. When the power button 20a is turned ON, power is supplied via an AC adapter (not shown) to each component of the game apparatus 12, so that the system LSI 42 is set to be in a normal conductive state (hereinafter referred to as a "normal mode"). On the other hand, when the power button 20a is turned OFF, power is supplied only to a portion of the components of the game apparatus 12, and the system LSI 42 is set to be in a mode in which power consumption is suppressed to a minimum level (hereinafter referred to as a "standby mode"). In this example, in the standby mode, the system LSI 42 outputs an instruction to stop power supply to components other than the input/output processor 42a, the flash memory 44, the external main memory 46, the ROM/RTC 48, the wireless communication module 50, and the wireless controller module 52. Therefore, in the standby mode, the CPU 40 does not execute an application.

Although power is supplied to the system LSI 42 even in the standby mode, a clock is not supplied to the GPU 42b, the DSP 42c or the VRAM 42d so that they are not driven, resulting in a decrease in power consumption.

Moreover, a fan for emitting heat of ICs, such as the CPU 40, the system LSI 42 and the like, is provided in the housing 14 of the game apparatus 12, though not shown. The fan is also stopped in the standby mode.

Note that, when the standby mode is not desired, then if the system LSI 42 is set so that the standby mode is not to be used, power supply to all circuit components is completely stopped when the power button 20a is turned OFF.

The normal mode and the standby mode can be switched by turning ON/OFF a power switch 26h (see FIGS. 3A to 3E) of the controller 22 or by a remote operation. When the remote operation is not performed, the system LSI 42 may be set so that power is not supplied to the wireless controller module 52 in the standby mode.

The reset button 20b is also connected to the system LSI 42. When the reset button 20b is pushed down, the system LSI 42 reboots the boot program of the game apparatus 12. The eject button 20c is connected to the disc drive 54. When the eject button 20c is pushed down, the optical disc 18 is ejected from the disc drive 54.

Figure 3A:
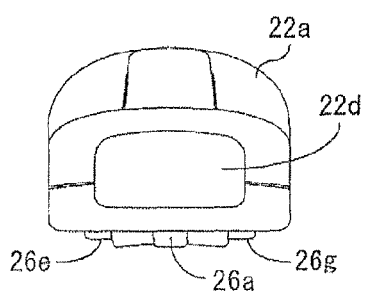
FIGS. 3A to 3E are diagrams showing exemplary external views of a controller 22.
Figure 3E:
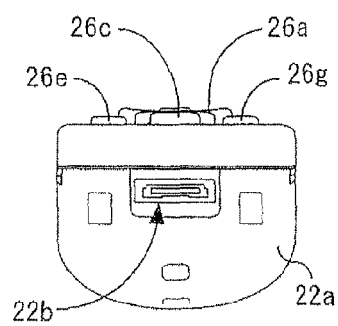
Figure 3B:
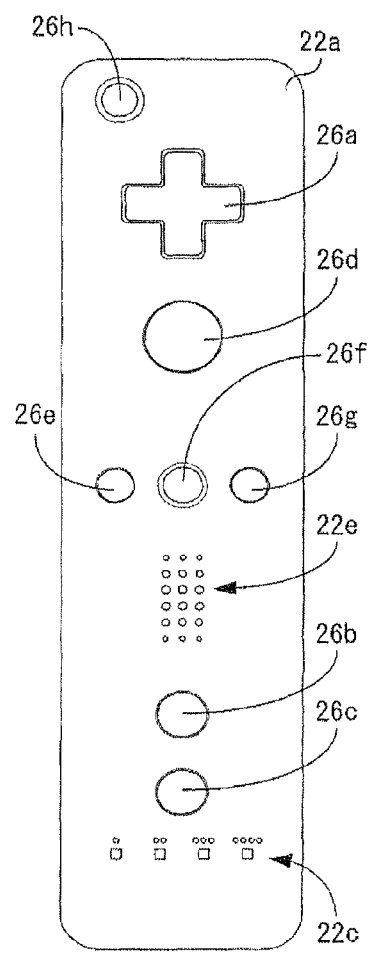
Figure 3C:
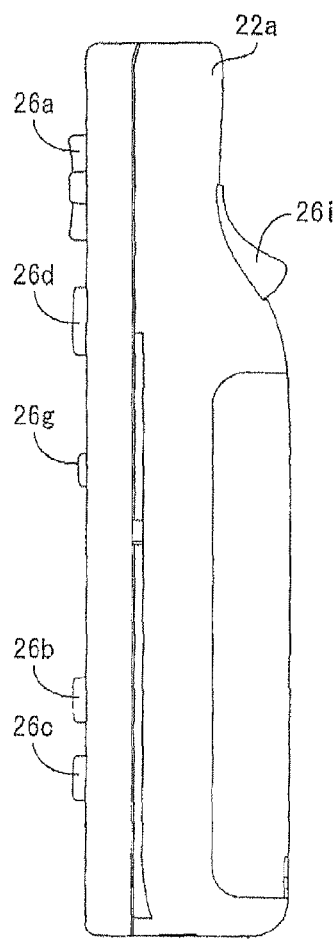
Figure 3D:
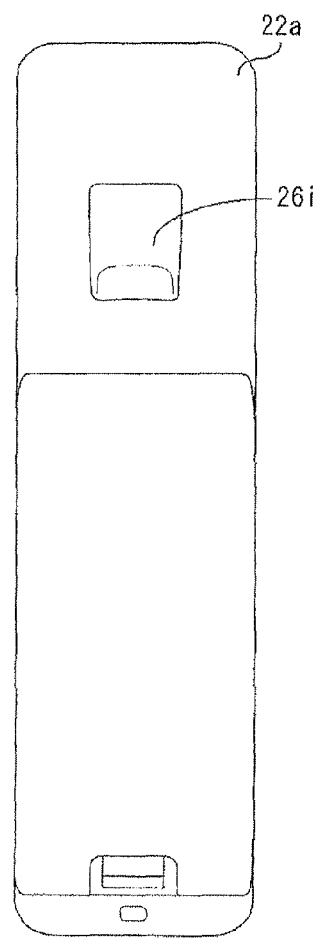

FIGS. 3A to 3E are diagrams showing exemplary external views of the controller 22. FIG. 3A shows a front end surface of the controller 22. FIG. 3B shows an upper surface of the controller 22. FIG. 3C shows a right side surface of the controller 22. FIG. 3D shows a bottom surface of the controller 22. FIG. 3E shows a rear end surface of the controller 22.

Referring to FIGS. 3A to 3E, the controller 22 has a housing 22a formed by, for example, plastic molding. The housing 22a is in the shape of substantially a rectangular parallelepiped, and has a size which allows the user to hold the controller 22 with one hand. The housing 22a (controller 22) is provided with the input means (a plurality of buttons or switches) 26. Specifically, as shown in FIG. 3B, a cross-key 26a, a 1-button 26b, a 2-button 26c, an A-button 26d, a "−" button 26e, a HOME button 26f, a "+" button 26g, and the power switch 26h are provided in the upper surface of the housing 22a. Also, as shown in FIGS. 3C and 3D, a slope surface is formed in the bottom surface of the housing 22a. A B-trigger switch 26i is provided in the slope surface.

The cross-key 26a is a 4-direction push switch which includes operation portions corresponding to four directions indicated by arrows, i.e., forward (or upward), backward (or downward), rightward and leftward directions. By operating one of the operation portions, the user can indicate a movement direction of a character or an object (a user character or a user object) which the user can operate, or a movement direction of a cursor.

The 1-button 26b and the 2-button 26c are each a push button switch. For example, the 1-button 26b and the 2-button 26c are used to perform a game operation, such as adjustment of a viewpoint position or a viewpoint direction (i.e., a position or an angle of view of a virtual camera) when a three-dimensional game image is displayed. Also, the 1-button 26b and the 2-button 26c may be used to perform the same operations as those of the A-button 26d and the B-trigger switch 26i or supplementary operations.

The A-button switch 26d is a push button switch which causes a user character or a user object to perform any action other the direction specification, i.e., hitting (punching), throwing, catching (getting), riding, jumping or the like. For example, in an action game, an instruction to jump, punch, move a weapon or the like can be input.

Also, in a role playing game (RPG) or a simulation RPG, an instruction to get an item, select a weapon or a command, make a decision or the like can be input.

The "−" button 26e, the HOME button 26f, the "+" button 26g and the power switch 26h are also push button switches. The "−" button 26e is used to select a game mode. The HOME button 26f is used to display a game menu (menu screen). The "+" button 26g is used to, for example, start (resume) or temporarily stop a game. The power switch 26h is used to turn ON/OFF a power supply of the game apparatus 12 by a remote operation.

Note that, in this example, a power switch for turning ON/OFF the controller 22 itself is not provided, and the controller 22 is turned ON by operating any of the input means 26 of the controller 22, and is automatically turned OFF if none of the input means 26 is performed for a predetermined period of time (e.g., 30 sec) or more.

The B-trigger switch 26i is also a push button switch, and is mainly used to provide an input mimicking a trigger for shooting a bullet or the like, or designate a position selected by the controller 22. When the B-trigger switch 26i continues to be pressed, an operation or a parameter of a user object can be maintained in a predetermined state. Also, in a certain case, the B-trigger switch 26i functions in a manner similar to that of a typical B-button, i.e., is used to cancel an action decided by the A-button 26d.

Also, as shown in FIG. 3E, an external extension connector 22b is provided in the rear end surface of the housing 22a. Also, as shown in FIG. 3B, an indicator 22c is provided in a portion closer to the rear end surface of the upper surface of the housing 22a. The external extension connector 22b is used to, for example, connect to another extension controller (not shown). The indicator 22c includes, for example, four LEDs. By turning ON one of the four LEDs, identification information (controller number) of a controller 22 corresponding to the LED turned ON can be indicated. Alternatively, the remaining amount of the power supply of the controller 22 can be indicated by the number of LEDs which are turned ON.

Moreover, the controller 22 has an image capture information computing unit 80 (see FIG. 4). As shown in FIG. 3A, a light incident portion 22d of the image capture information computing unit 80 is provided in the front end surface of the housing 22a. The controller 22 also has a loudspeaker 86 (see FIG. 4). As shown in FIG. 3B, the loudspeaker 86 is provided in the housing 22a, corresponding to a sound hole 22e which is provided in the upper surface of the housing 22a and between the 1-button 26b and the HOME button 26f.

Note that the shape of the controller 22 and the shapes, number and installation positions of the input means 26 shown in FIGS. 3A to 3E are only for illustrative purposes. Various modifications and changes can be made thereto within the scope of the present invention.

FIG. 4 is a block diagram showing an electrical configuration of the controller 22. Referring to FIG. 4, the controller 22 includes a processor 70. The external extension connector 22b, the input means 26, a memory 72, an acceleration sensor 74, a radio module 76, the image capture information computing unit 80, LEDs 82 (the indicator 22c), a vibrator 84, the loudspeaker 86, and a power supply circuit 88 are connected via an internal bus (not shown) to the processor 70. An antenna 78 is connected to the radio module 76.

The processor 70 controls the overall operation of the controller 22. The processor 70 transmits (inputs) information (input information) received from the input means 26, the acceleration sensor 74 and the image capture information computing unit 80, as input data, to the game apparatus 12 via the radio module 76 and the antenna 78. In this case, the processor 70 employs the memory 72 as a work area or a buffer area.

An operation signal (operation data) from the input means 26 (26a to 26i) is input to the processor 70. The processor 70 temporarily stores the operation data in the memory 72.

Also, the acceleration sensor 74 detects an acceleration along each of three axes in a vertical direction (y-axis direction), a lateral direction (x-axis direction) and a front-to-rear direction (z-axis direction) of the controller 22. The acceleration sensor 74 is typically of a capacitance type or may be of other types.

For example, the acceleration sensor 74 detects accelerations (ax, ay, az) along the x-axis, the y-axis and the z-axis and outputs data of the accelerations (acceleration data) to the processor 70 at first predetermined intervals. For example, the acceleration sensor 74 detects an acceleration in each axial direction within the range of −2.0 g to 2.0 g (g herein indicates the gravitational acceleration). The processor 70 detects acceleration data received from the acceleration sensor 74 at second predetermined intervals and temporarily stores the acceleration data in the memory 72. The processor 70 generates input data containing at least one of operation data, acceleration data, and marker coordinate data (described below), and transmits the generated input data to the game apparatus 12 at third predetermined intervals (e.g., 5 msec).

Note that, in this example, the acceleration sensor 74 is provided at a portion in the vicinity of the cross-key 26a of the printed board in the housing 22a, though not shown in FIGS. 3A to 3E.

The radio module 76 uses, for example, the Bluetooth® technique to modulate carrier waves having a predetermined frequency with input data, and emits a resultant weak radio wave signal from the antenna 78. In other words, the input data is modulated by the radio module 76 into the weak radio wave signal, which is in turn transmitted from the antenna 78 (controller 22). The weak radio wave signal is received by the wireless controller module 52 of the game apparatus 12. The received weak radio waves are subjected to demodulation and decoding processes, and therefore, the game apparatus 12 can acquire the input data from the controller 22. Thereafter, the CPU 40 performs a game process based on the acquired input data and a program (game program).

Moreover, as described above, the controller 22 includes the image capture information computing section 80. The image capture information computing section 80 includes an infrared filter 80a, a lens 80b, an image capturing device 80c, and an image processing circuit 80d. The infrared filter 80a passes only an infrared part of light entering from the front of the controller 22. As described above, the markers 340m and 340n provided in the vicinity of (around) the display screen of the monitor 34 are infrared LEDs which output infrared light toward the front of the monitor 34. Therefore, by providing the infrared filter 80a, images of the markers 340m and 340n can be more correctly captured. The lens 84 collects infrared light passing through the infrared filter 82 and emits the infrared light to the image capturing device 80c. The image capturing device 80c, which is, for example, a solid-state image capturing device, such as a CMOS sensor or a CCD sensor, receives infrared light collected by the lens 80b. Therefore, the image capturing device 80c captures only infrared light passing through the infrared filter 80a to generate image data. Hereinafter, the image captured by the image capturing device 80c is referred to as a captured image. The image data generated by the image capturing device 80c is processed by the image processing circuit 80d. The image processing circuit 80d calculates a position of a target object (the markers 340m and 340n) in the captured image, and outputs coordinates indicating the calculated position, as captured image data, to the processor 70 at fourth predetermined intervals. Note that the process of the image processing circuit 80d will be described below.

FIG. 5 is a perspective external view of the load controller 36 of FIG. 1. As shown in FIG. 5, the load controller 36 includes a platform 36a on which the user stands (the user puts their foot or feet thereon), and at least four load sensors 364 (364a to 364d) for detecting a load on the platform 36a. Note that each load sensor 364 is provided inside the platform 36a (see FIG. 7) and is shown with a dashed line in FIG. 5.

The platform 36a is in the shape of substantially a rectangular parallelepiped, and is in the shape of substantially a rectangle as viewed from the top. For example, the short side and the long side of the rectangle are set to about 30 cm and about 50 cm, respectively. The platform 36a has a flat upper surface on which the user stands. The platform 36a has four corner side surfaces each partially sticking out in a cylindrical shape.

In the platform 36a, the four load sensors 364 are arranged at predetermined intervals. In this example, the four load sensors 364 are arranged in a periphery of the platform 36a, specifically, at the respective four corners. The intervals at which the load sensors 364 are arranged are set to appropriate values which allow accurate detection of what is intended by a game operation depending on the way in which the user puts a load onto the platform 36a.

Figure 6:
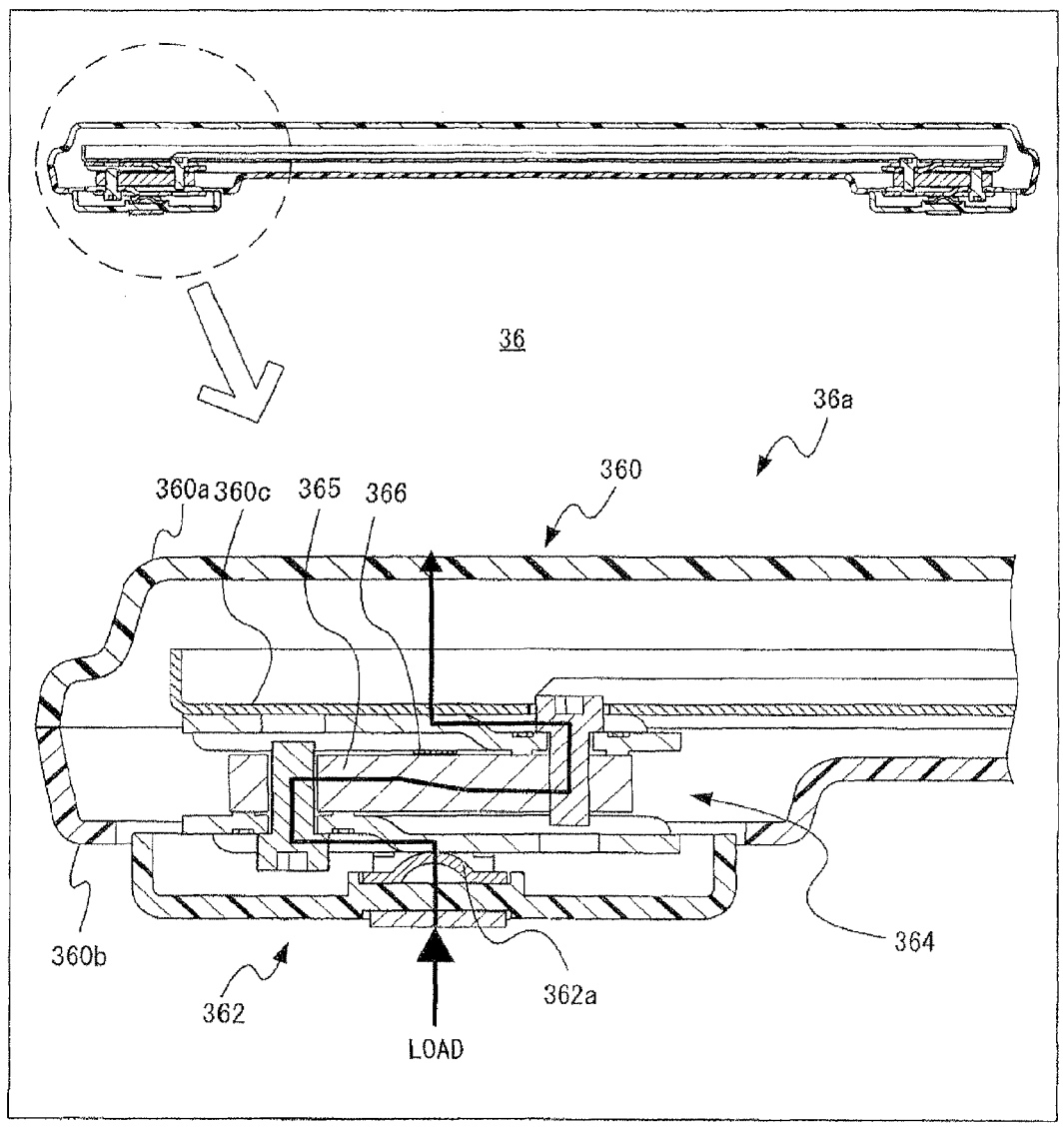
FIG. 6 is a cross-sectional view of the load controller 36 taken along line VI-VI of FIG. 5.

FIG. 6 shows a cross-sectional view of the load controller 36 taken along line VI-VI of FIG. 5 and an enlarged view of a corner portion of the load controller 36 in which a load sensor 364 is provided. As can be seen from FIG. 6, the platform 36a includes a support plate 360 on which the user stands, and legs 362. The legs 362 are provided at portions where the load sensors 364 are arranged. In this example, since the four load sensors 364 are arranged at the four corners, the four legs 362 are also provided at the four corners. Each leg 362 is formed by plastic molding in the shape of substantially a cylinder with a base. The load sensors 364 are each provided on a spherical part 362a provided on the base of the corresponding leg 362. The support plate 360 is supported by the legs 362 with the load sensors 364 being interposed therebetween.

The support plate 360 includes an upper plate 360a forming an upper surface and an upper side surface portion, a lower plate 360b forming a lower surface and a lower side surface portion, and an intermediate plate 360c provided between the upper plate 360a and the lower plate 360b. The upper plate 360a and the lower plate 360b are formed by, for example, plastic molding, and are integrated using an adhesive or the like.

The intermediate plate 360c is, for example, formed of a single metal plate by press forming The intermediate plate 360c is fixed onto the four load sensors 364. The upper plate 360a has a grid-patterned rib (not shown) on a lower surface thereof. The upper plate 360a is supported by the intermediate plate 360c with the rib being interposed therebetween. Therefore, when the user stands on the platform 36a, the load is transferred to the support plate 360, the load sensors 364 and the legs 362. As indicated with arrows in FIG. 6, reactions from a floor generated by the input load are transferred from the legs 362 via the spherical parts 362a, the load sensors 364 and the intermediate plate 360c to the upper plate 360a.

Each load sensor 364 is, for example, a strain gauge (strain sensor) load cell, which is a load transducer which converts an input load to an electrical signal. In the load sensor 364, a structural member 365 is deformed, depending on an input load, resulting in strain. The strain is converted into a change in electrical resistance and is then converted into a change in voltage by a strain sensor 366 attached to the structural member. Therefore, the load sensor 364 outputs a voltage signal indicating the input load from an output terminal thereof.

Note that the load sensor 364 may be of other types, such as a tuning fork type, a string vibration type, a capacitance type, a piezoelectric type, a magnetostrictive type, and a gyroscopic type.

Referring back to FIG. 5, the load controller 36 further includes a power button 36c. When the power button 36c is turned ON, power is supplied to each circuit component (see FIG. 7) of the load controller 36. Note that the load controller 36 may be powered ON in accordance with an instruction from the game apparatus 12. Also, the load controller 36 is powered OFF if a state in which the user does not stand on the load controller 36 continues for a predetermined period of time (e.g., 30 sec) or more. Note that, when the load controller 36 is in the active state, then if the power button 36c is pushed down, the load controller 36 may be powered OFF.

Figure 7:
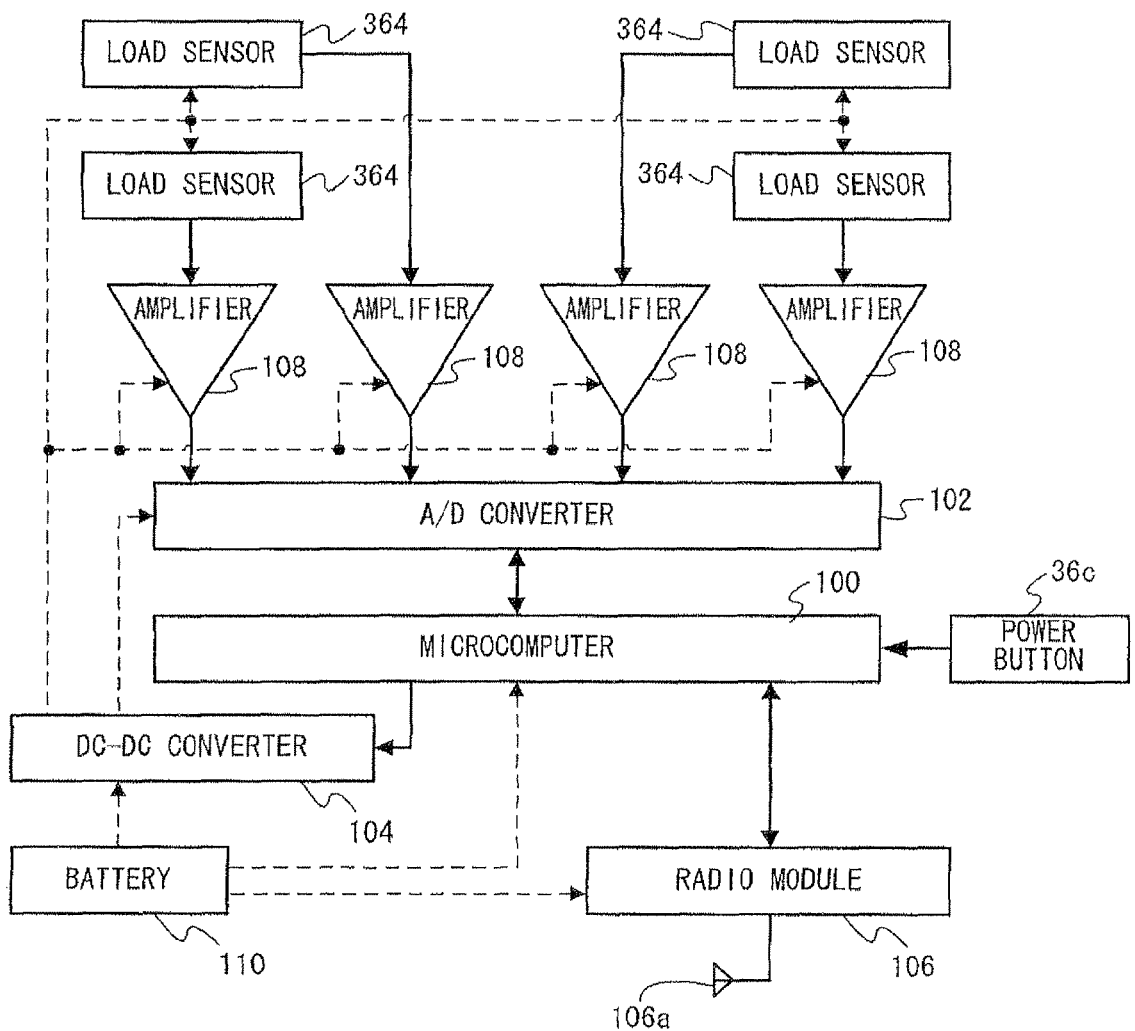
FIG. 7 is a block diagram showing an exemplary electrical configuration of the load controller 36.

FIG. 7 is a block diagram showing an exemplary electrical configuration of the load controller 36. Note that signal and communication flows are indicated by solid lines with an arrow or arrows in FIG. 7. Dashed lines with an arrow or arrows indicate supply of power.

The load controller 36 includes a microcomputer 100 for controlling the operation of the load controller 36. The microcomputer 100 includes a CPU, a ROM, a RAM and the like (not shown). The CPU controls the operation of the load controller 36 in accordance with a program stored in the ROM.

The power button 36c, an A/D converter 102, a DC-DC converter 104, and a radio module 106 are connected to the microcomputer 100. Moreover, an antenna 106a is connected to the radio module 106. The four load sensors 364 are connected via respective amplifiers 108 to the A/D converter 102.

The load controller 36 also accommodates a battery 110 for supplying power. In other examples, an AC adapter may be connected to the load controller 36 instead of the battery so that commercial power is supplied to the load controller 36. In this case, a power supply circuit which converts alternating current into direct current and decreases and rectifies direct voltage needs to be provided instead of the DC-DC converter. In this example, power is supplied directly from the battery 110 to the microcomputer 100 and the radio module 106. In other words, power is invariably supplied to a portion (CPU) of the components of the microcomputer 100 and the radio module 106 so as to determine whether or not the power button 36c has been pushed down or whether or not a command to power ON (detection of a load) has been transmitted from the game apparatus 12. On the other hand, power is supplied to the load sensors 364, the A/D converter 102 and the amplifiers 108 from the battery 110 via the DC-DC converter 104. The DC-DC converter 104 converts the voltage value of the direct current from the battery 110 to a different voltage value, and supplies the resultant power to the load sensors 364, the A/D converter 102 and the amplifiers 108.

The supply of power to the load sensors 364, the A/D converter 102 and the amplifiers 108 may be performed as required by the microcomputer 100 controlling the DC-DC converter 104. Specifically, the microcomputer 100, when determining that it is necessary to operate the load sensors 364 to detect a load, may control the DC-DC converter 104 to supply power to the load sensors 364, the A/D converter 102 and the amplifiers 108.

When power is supplied to the load sensors 364, each load sensor 364 outputs a signal indicated a load input thereto. The signals are amplified by the respective amplifiers 108, and are converted from analog signals into digital data by the A/D converter 102. The digital data is input to the microcomputer 100. A detected value of each load sensor 364 is given identification information of the load sensor 364. Therefore, each load sensor 364 can be identified from a corresponding detected value. Thus, the microcomputer 100 can acquire data indicating detected load values at the same time of the four load sensors 364.

On the other hand, the microcomputer 100, when determining that it is not necessary to operate the load sensors 364 (i.e., it is not the timing of load detection), controls the DC-DC converter 104 to stop the supply of power to the load sensors 364, the A/D converter 102 and the amplifiers 108. Thus, the load controller 36 can operate the load sensors 364 to detect a load only when it is required, whereby power consumption for load detection can be suppressed.

The load detection is typically required when the game apparatus 12 (FIG. 1) needs to acquire load data. For example, the game apparatus 12, when requiring load information, transmits a load acquisition command to the load controller 36. The microcomputer 100, when receiving the load acquisition command from the game apparatus 12, controls the DC-DC converter 104 to supply power to the load sensors 364 and the like so as to detect a load. On the other hand, the microcomputer 100, when not receiving the load acquisition command from the game apparatus 12, controls the DC-DC converter 104 to stop supply of power.

Alternatively, the microcomputer 100 may determine that load detection timing occurs at predetermined intervals and control the DC-DC converter 104. When the load detection is thus periodically performed, cycle information may be initially supplied and stored from the game apparatus 12 into the microcomputer 100 of the load controller 36 or may be previously stored in the microcomputer 100, for example.

Data indicating detected values from the load sensors 364 is transmitted as operation data (input data) of the load controller 36 from the microcomputer 100 via the radio module 106 and an antenna 106b to the game apparatus 12 (FIG. 1). For example, when receiving a command from the game apparatus 12 and performing the load detection, then if receiving detected value data of the load sensors 364 from the A/D converter 102, the microcomputer 100 transmits the detected value data to the game apparatus 12. Alternatively, the microcomputer 100 may transmit detected value data to the game apparatus 12 at predetermined intervals. If the cycle of the transmission is longer than the cycle of the load detection, data containing load values which are detected at a plurality of detection timings until the next transmission timing is transmitted.

Note that the radio module 106 can perform communication in accordance with the same wireless standard (Bluetooth®, wireless LAN, etc.) as that of the wireless controller module 52 of the game apparatus 12. Therefore, the CPU 40 of the game apparatus 12 can transmit the load acquisition command via the wireless controller module 52 and the like to the load controller 36. The microcomputer 100 of the load controller 36 can receive the command via the radio module 106 and the antenna 106a from the game apparatus 12, and transmit input data containing a detected load value (or a calculated load value) of each load sensor 364 to the game apparatus 12.

For example, in a game which is executed based on a simple sum of four load values detected by the four load sensors 364, the user is permitted to stand at any position with respect to the four load sensors 364 of the load controller 36, i.e., the user is permitted to stand on the platform 36a at any position and in any orientation to play a game. In some kinds of games, however, the direction of a load value detected by each load sensor 364 as viewed from the user needs to be identified, i.e., a positional relationship between the four load sensors 364 of the load controller 36 and the user needs to be recognized. In this case, for example, the positional relationship between the four load sensors 364 and the user may be previously defined, and the user may be supposed to stand on the platform 36a in a manner which allows the predetermined positional relationship. Typically, a positional relationship in which there are two load sensors 364 in front of, behind, to the right of, and to the left of the user standing at a middle of the platform 36a, i.e., a positional relationship in which, when the user stands at a middle of the platform 36a of the load controller 36, there is a load sensor 364 in front right, front left, rear right and rear left directions with respect to the user as a center, is defined. In this case of this example, the platform 36a of the load controller 36 is in the shape of a rectangle as viewed from the top and the power button 36c is provided at one side (long side) of the rectangle. Therefore, it is previously ruled that the user should stand on the platform 36a using the power button 36c as a guide in a manner which allows the long side at which the power button 36c is provided to be located in a predetermined direction (front, rear, left or right). In this case, a load value detected by each load sensor 364 is located in a predetermined direction (front right, front left, rear right, and rear left) as viewed from the user. Therefore, the load controller 36 and the game apparatus 12 can find out a direction in which each detected load value is located as viewed from the user, based on the identification information of the load sensors 364 contained in the detected load value data and arrangement data indicating previously set (stored) positions or directions of the load sensors 364 with respect to the user. As a result, for example, it is possible to recognize what is intended by a game operation input by the user, such as forward, backward, rightward and leftward operation directions and the like.

Note that the arrangement of the load sensors 364 with respect to the user may not be previously defined, and may be input and set by the user during initial setting or during a game. For example, a screen may be displayed which instructs the user to stand on a portion in a predetermined direction (front left, front right, rear left, rear right, etc.) as viewed from the user, and load values may be acquired, so that a positional relationship between the load sensors 364 and the user can be specified, and therefore, arrangement data may be generated and stored based on these settings. Alternatively, a screen for selecting an arrangement of the load controllers 36 may be displayed on the monitor 34 to cause the user to select a direction in which a guide (the power button 36c) is located as viewed from the user by an input using the controller 22. Arrangement data of the load sensors 364 may be generated and stored based on the selection.

Figure 8:
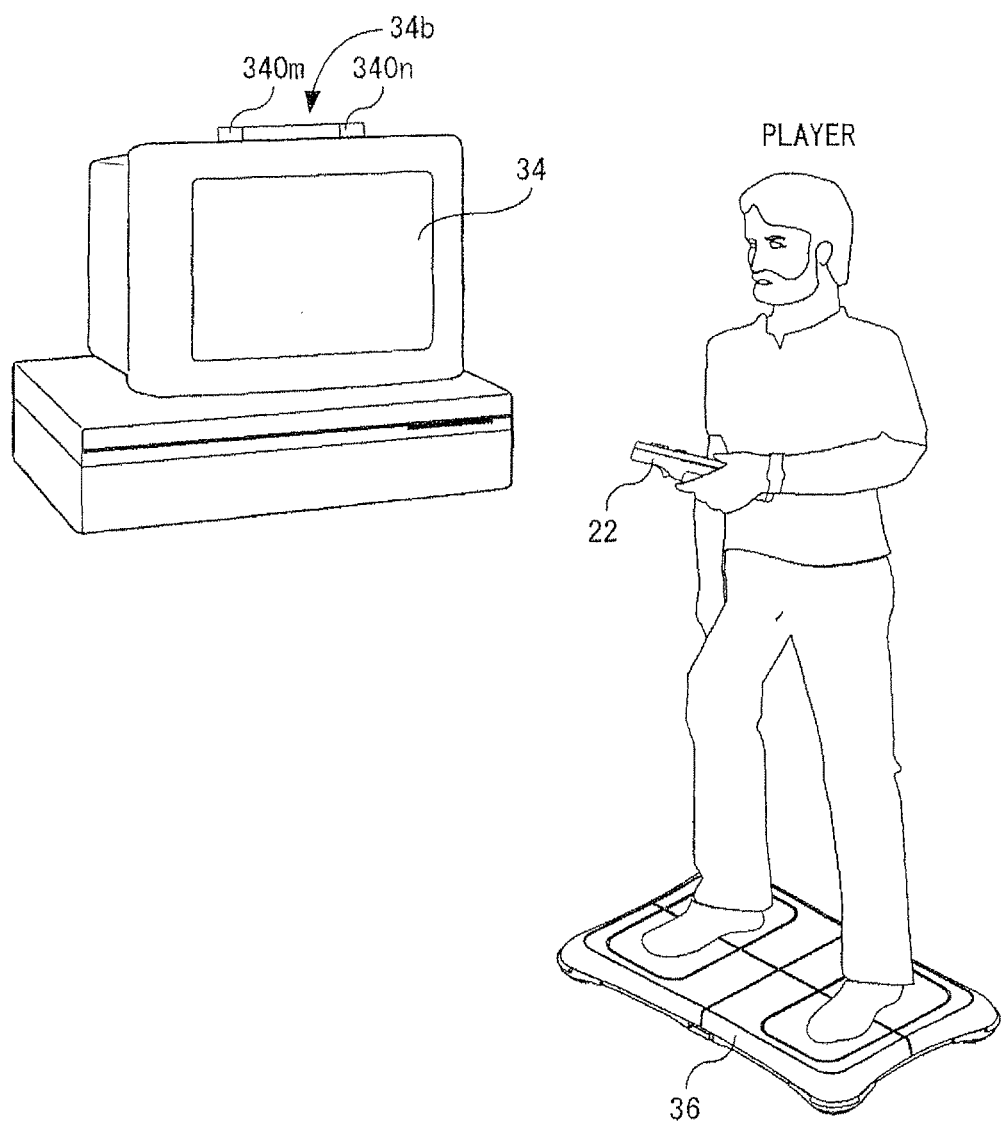
FIG. 8 is a diagram for briefly describing a situation in which the user plays a game using the controller 22 and the load controller 36.

FIG. 8 is a diagram for briefly describing a situation in which the user plays a game using the controller 22 and the load controller 36. As shown in FIG. 8, when playing a game in the video game system 10 using the controller 22 and the load controller 36, the user stands on the load controller 36 and holds the controller 22 with one hand. Specifically, the user stands on the load controller 36 and holds the controller 22 in a position which allows the front end surface (the light incident portion 22d of the image capture information computing unit 80) of the controller 22 to point toward the markers 340m and 340n. Note that, as can also be seen from FIG. 1, the markers 340m and 340n are arranged in parallel to a horizontal direction of the screen of the monitor 34. In this situation, the user performs a game operation by changing a position on the screen pointed by the controller 22 or changing a distance between the controller 22 and each of the markers 340m and 340n.

Note that, in FIG. 8, the load controller 36 is positioned with a long side direction being perpendicular to the screen of the monitor 34, i.e., the user stands sideways with respect to the screen. Alternatively, the positioning of the load controller 36 and the orientation of the user with respect to the screen can be changed as appropriate, depending on the type of a game. For example, the load controller 36 may be positioned with the long side direction being parallel to the screen, and the user may stand facing the screen.

Figure 9:
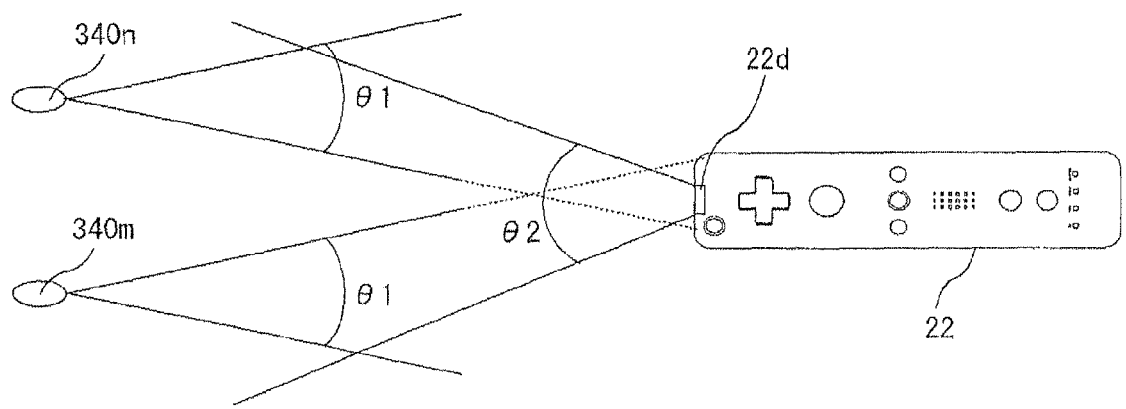
FIG. 9 is a diagram for describing angles of view of markers 340m and 340n and the controller 22.

FIG. 9 is a diagram for describing angles of view of the markers 340m and 340n and the controller 22. As shown in FIG. 9, the markers 340m and 340n emit infrared light within the range of an angle of view $\theta 1$. The image capturing device 80c of the image capture information computing unit 80 can receive incident light within the range of an angle of view $\theta 2$ about a line-of-sight direction of the controller 22. For example, the angle of view $\theta 1$ of each of the markers 340m and 340n is 34° (half-value angle). The angle of view $\theta 2$ of the image capturing device 80c is 41°. The user holds the controller 22 in a position and an orientation which allow the image capturing device 80c to receive infrared light from the two markers 340m and 340n. Specifically, the user holds the controller 22 in a manner so that at least one of the markers 340m and 340n is located within the angle of view $\theta 2$ of the image capturing device 80c, and the controller 22 is located within the angle of view $\theta 1$ of at least one of the markers 340m and 340n. In this situation, the controller 22 can sense at least one of the markers 340m and 340n. The user can perform a game operation by changing the position and orientation of the controller 22 within a range which satisfies this situation.

Note that when the position or orientation of the controller 22 is out of the range, a game operation cannot be performed based on the position and orientation of the controller 22. Hereinafter, the range is referred to as an "operable range".

Figure 10:
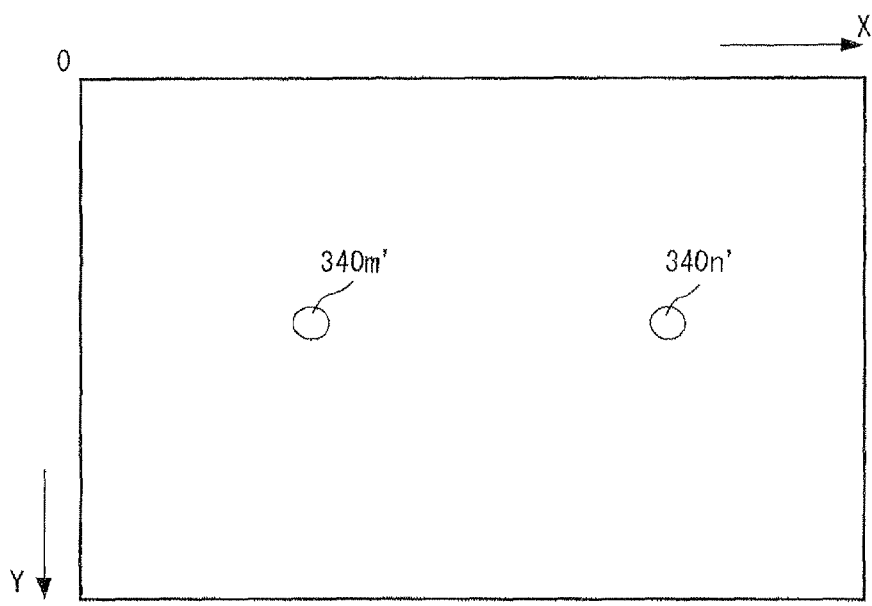
FIG. 10 is a diagram showing an exemplary captured image containing target images.

When the controller 22 is held within the operable range, the image capture information computing unit 80 captures an image of each of the markers 340m and 340n. Specifically, an image captured by the image capturing device 80c contains the image (target image) of each of the markers 340m and 340n whose images are targets to be taken. FIG. 10 is a diagram showing an exemplary captured image containing target images. The image processing circuit 80d calculates coordinates (marker coordinates) in the captured image of each of the markers 340m and 340n using image data of the captured image containing the target images.

The target image appears as a high luminance portion in the image data of the captured image. Therefore, the image processing circuit 80d initially detects the high luminance portion as a candidate for the target image. Next, the image processing circuit 80d determines whether or not the high luminance portion is the target image, based on a size of the detected high luminance portion. The captured image may contain an image caused by sunlight through a window or light of a fluorescent tube in a room in addition to target images 340m' and 340n' of the two the markers 340m and 340n. The process of determining whether or not the high luminance portion is the target image is executed so as to distinguish the target images 340m' and 340n' of the two the markers 340m and 340n from other images to correctly detect the target images. Specifically, in the determination process, it is determined whether or not the detected high luminance portion has a size within a predetermined range. When the high luminance portion has a size within the predetermined range, the high luminance portion is determined to represent the target image. Conversely, when the size of the high luminance portion does not fall within the predetermined range, the high luminance portion is determined to be an image other than the target images.

Moreover, for a high luminance portion which has been determined to represent the target image as a result of the determination process, the image processing circuit 80*d* calculates a position of the high luminance portion. Specifically, a position of the center of gravity of the high luminance portion is calculated. Coordinates of the center-of-gravity position of the high luminance portion are herein referred to as marker coordinates. The marker coordinates can be calculated with a scale finer than the resolution of the image capturing device 80*c*. Here, it is assumed that an image captured by the image capturing device 80*c* has a resolution of 126×96, and the marker coordinates are calculated with a scale of 1024×768. The marker coordinates are represented with integer values in the range of (0, 0) to (1024, 768).

Note that it is assumed that the position of a captured image is represented by a coordinate system (XY coordinate system) in which an upper left point of the captured image is the origin, a downward direction is the positive direction of the Y-axis, and a rightward direction is the positive direction of the X-axis.

When the target image is correctly detected, the determination process determines two high luminance portions as the target images, so that two marker coordinate points are calculated. The image processing circuit 80*d* outputs data indicating the two calculated marker coordinate points. The output data of the marker coordinates (marker coordinate data) is incorporated into input data by the processor 70 as described above, and is transmitted to the game apparatus 12.

The game apparatus 12 (the CPU 40), when detecting marker coordinate data from received input data, can calculate a position (coordinates) on the screen of the monitor 34 pointed by the controller 22, and a distance between the controller 22 and each of the markers 340*m* and 340*n*, based on the marker coordinate data. Specifically, a position pointed by the controller 22 (pointed position) is calculated from a middle point between the two marker coordinate points. Therefore, the controller 22 functions as a pointing device which points any position within the screen of the monitor 34. The pointed position of the controller 22 is ideally a position where a straight line extending from the front end surface of the controller 22 in a longitudinal direction of the controller 22 intersects the screen of the monitor 34. Also, a distance between the target images in the captured image varies, depending on the distances between the controller 22 and the markers 340*m* and 340*n*. Therefore, by calculating a distance between the two marker coordinate points, the game apparatus 12 can find out the distances between the controller 22 and the markers 340*m* and 340*n*.

(Menu Operation)

Figure 11:
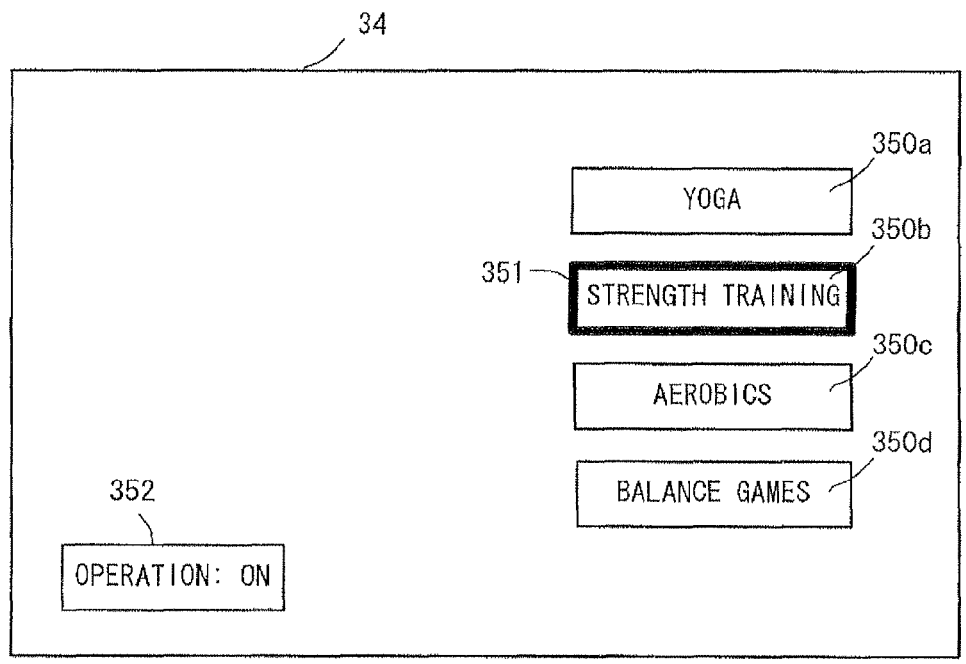
FIG. 11 is a diagram showing an exemplary menu screen of a game performed in this example.
Figure 12:
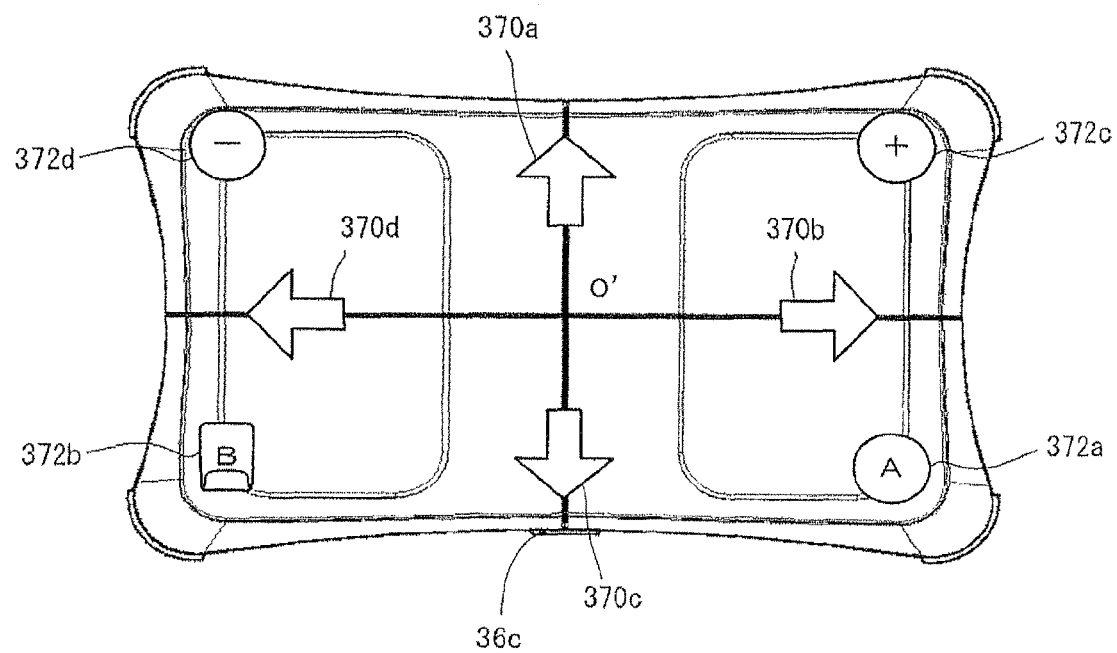
FIG. 12 is a diagram schematically showing assignment of operation areas for a menu operation to specific areas of the load controller 36.

Next, a menu operation which is performed using the load controller 36 of this example will be described. This example is a game in which the user stands on the load controller 36 and performs various exercises (e.g., "yoga", "strength training", etc.). The user initially selects and decides an exercise which the user is to perform, from a menu screen. FIG. 11 is a diagram showing an exemplary menu screen of the game performed in this example. The menu screen of FIG. 11 is, for example, initially displayed when the user starts the game. As shown in FIG. 11, the menu screen displays item images 350*a* to 350*d* indicating items. The item images 350*a* to 350*d* correspond to respective exercise types. A cursor 351 indicating an item currently selected is displayed. Also, a display image 352 is displayed which indicates that a menu operation can be performed using the load controller 36. The display image 352 may be a message indicating that a menu operation can be performed using the load controller 36, or illustrates which area of the platform 36*a* of the load controller 36 corresponds to which operation button as shown in FIG. 12.

In this example, the user moves the cursor 351 to a desired item image on the menu screen, thereby selecting and deciding an exercise type which the user is to perform. Here, the user can perform a menu operation (operation of selecting and deciding an item image) by two methods. Specifically, the two methods are a method of using the controller 22 and a method of using the load controller 36. In the method of using the controller 22, a menu operation is performed by using the controller 22 to point a position on the screen of the monitor 34 (pointing operation), or by using the cross-key 26*a* of the input means 26 of the controller 22 (cross-key operation). In the method of using the load controller 36, a menu operation is performed by the user stepping on a predetermined position on the load controller 36. In this example, the user does not stand on the load controller 36 and instead steps on the load controller 36 using one foot to perform a menu operation. When the user stands on the load controller 36 (the user stands on the load controller 36 using their both feet), a menu operation using the load controller 36 is not accepted, and only a menu operation using the controller 22 is accepted. Hereinafter, the menu operation using the load controller 36 will be described in detail.

The user performs a menu operation by stepping on the platform 36*a* of the load controller 36. Specifically, for example, the user stands behind the load controller 36, facing the long side at which the power button 36*c* is provided, and steps on a predetermined position on the platform 36*a* using one foot (i.e., the user does not completely stand on the platform 36*a*). On the platform 36*a* of the load controller 36, movement operation areas for moving the cursor 351 in upward, downward, rightward and leftward directions, and a determination operation area for deciding an item or the like, are previously defined. FIG. 12 is a diagram schematically showing assignment of the operation areas to specific areas of the load controller 36. The operation areas correspond to operation buttons (the cross-key 26*a*, the A-button 26*d*, etc.) of the input means 26 of the controller 22. Specifically, as shown in FIG. 12, a cross-key area 370 corresponding to the cross-key 26*a* of the controller 22 (direction key areas 370*a* to 370*d* corresponding to the respective corresponding direction keys of the cross-key 26*a*), an A-button area 372*a* corresponding to the A-button 26*d*, a B-switch area 372*b* corresponding to the B-trigger switch 26*i*, a "+" button area 372*c* corresponding to the "+" button 26*g*, and a "−" button area 372*d* corresponding to the "−" button 26*e* are defined on the load controller 36. Note that the operation areas (370*a* to 370*d* and 372*a* to 372*d*) of FIG. 12 are not actually displayed on the platform 36*a* of the load controller 36, and are defined as input areas in a coordinate space managed by the game apparatus 12, which correspond to the respective operation areas on the platform 36*a*.

Figure 13:
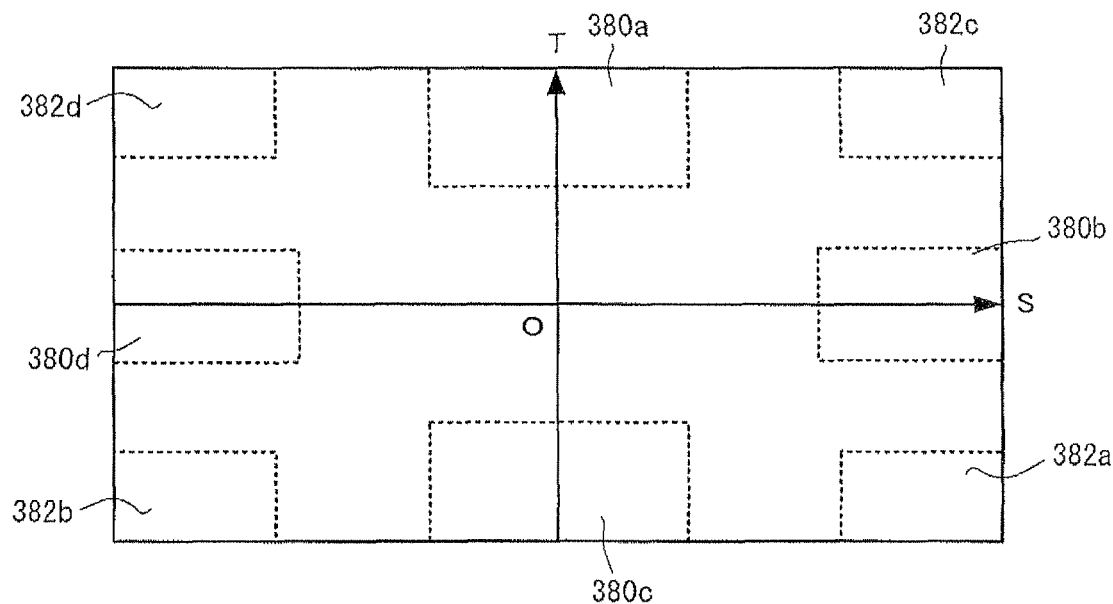

FIG. 13 is a diagram showing input areas in a coordinate space corresponding to the respective operation areas of the platform 36*a*. As shown in FIG. 13, an origin O of the ST coordinate space corresponds to a center O' of the platform 36*a* (see FIG. 12). The positive direction of the S-axis corresponds to a direction from a left end portion to a right end portion of the load controller 36 (as viewed from the user standing behind the load controller 36, facing the long side at which the power button 36*c* is provided). The positive direction of the T-axis corresponds to a direction from a rear end portion to a front end portion of the load controller 36. As shown in FIG. 13, input areas 380a to 380d on the S and T coordinate axes correspond to the direction key areas 370a to 370d (see FIG. 12), respectively. More specifically, the input area 380a corresponds to the upward key area 370a. The input area 380b corresponds to the rightward key area 370b. The input area 380c corresponds to the downward key area 370c. The input area 380d corresponds to the leftward key area 370d. Similarly, an input area 382a on the S and T coordinate axes corresponds to the A-button area 372a. An input area 382b on the S and T coordinate axes corresponds to the B-switch area 372b. An input area 382c on the S and T coordinate axes corresponds to the "+" button area 372c. An input area 382d on the S and T coordinate axes corresponds to the "−" button area 372d.

When the user puts their foot on a predetermined area shown in FIG. 12, the load sensors 364a to 364d detect loads. Here, since the load sensors 364 are included in the four corners of the platform 36a, the load sensors 364 output load values varying depending on the position of the foot of the user. For example, when the user puts their foot on the rightward key area 370b of FIG. 12, load values detected by the rear right load sensor 364a and the front right load sensor 364c are larger than those detected by the rear left load sensor 364b and the front left load sensor 364d. Therefore, a center-of-gravity position on the platform 36a of applied loads can be calculated from the load values of the load sensors 364. Specifically, for example, the S coordinate (SG) and the T coordinate (TG) of the center-of-gravity position are calculated by:

$$SG = ((a+c) - (b+d)) \times m \quad (1)$$

$$TG = ((c+d) - (a+b)) \times n \quad (2)$$

where a indicates the load value of the rear right load sensor 364a, b indicates the load value of the rear left load sensor 364b, c indicates the load value of the front right load gsensor 364c, d indicates the load value of the front left load sensor 364d, and m and n indicate constants, and $-1 \leq SG \leq 1$ and $-1 \leq TG \leq 1$. Thus, SG is calculated based on a difference between the addition of the load values of the load sensors 364a and 364c on the right side and the addition of the load values of the load sensors 364b and 364d on the left side. Similarly, TG is calculated based on a difference between the addition of the load values of the load sensors 364c and 364d on the front side and the addition of the load values of the load sensors 364a and 364b on the rear side. Note that the expressions for calculating the center-of-gravity position are only for illustrative purposes. The center-of-gravity position may be calculated by other methods.

Based on the center-of-gravity position thus calculated, the cursor 351 may be moved in a predetermined direction, or an item selected using the cursor 351 may be decided. For example, when the calculated center-of-gravity position falls within the input area 380c of FIG. 13, the game apparatus 12 recognizes that the user steps on the downward key area 370c of the platform 36a, so that the game apparatus 12 moves the cursor 351 in a downward direction. When the calculated center-of-gravity position falls within the input area 382c, the game apparatus 12 recognizes that the user steps on the "+" button area 372c of the platform 36a, so that the game apparatus 12 decides an item selected by the cursor 351, for example.

Here, as shown in FIG. 13, the input areas 382a to 382d are set to be smaller than the input areas 380a to 380d, respectively. Specifically, the input areas 382a to 382d used for, e.g., an operation of deciding an item are set to be small than the input areas 380a to 380d used for movement of the cursor 351. Here, the operation of deciding an item, or the like is different from the operation of moving the cursor 351, and is an operation of deciding an item, an operation of transitioning to a screen different from the menu screen, or the like. When the input areas 382a to 382d are thus set to be smaller, the user needs to correctly and more strongly step on the four corners of the platform 36a so as to move the center-of-gravity position to the input areas. The reason is as follows. Specifically, the center-of-gravity position is calculated based on the difference between the load values of the load sensors 364 as can be seen from Expressions (1) and (2). For example, the center-of-gravity position in the horizontal direction (S-axis direction) is calculated based on a difference between the addition of the load values of the two load sensors 364a and 364c on the right side and the addition of the load values of the two load sensors 364b and 364d on the left side. For example, when the user weakly steps on the A-button area 372a (area where A is displayed) of FIG. 12, the load sensor 364a included in a portion below the area detects a load value, and the front right load sensor 364c and the rear left load sensor 364b also detect load values (the front left load sensor 364d may also detect a load value). Since the center-of-gravity position is determined by the difference between the load values detected by the load sensors 364, if the load value difference is small, the calculated center-of-gravity position is closer to the origin O. Therefore, when the user weakly steps on the platform 36a, the load value difference is so small that the center-of-gravity position may not fall within the input area 382a. When the user steps on a portion closer to the center O' than an area where A is displayed (FIG. 12), the calculated center-of-gravity position does not fall within the input area 382a irrespective of the magnitude of the force.

Operations corresponding to the input areas 382a to 382d have influence on events of a game, such as decision of an item, changing of screens, and the like. If the input areas 382a to 382d are set to be relatively small, the user needs to deliberately strongly step on the four corners of the platform 36a, so that it is possible to prevent the user from performing an erroneous input (i.e., when the user moves the cursor 351, decision of an item, changing of screens, or the like may occur although the user does not intend to do so). On the other hand, operations corresponding to the input areas 380a to 380d relate to movement of the cursor 351. Even if the user erroneously steps on the platform 36a to move the cursor 351, an item is not decided or screens are not changed, i.e., the state of a game is not affected. Therefore, even when the user erroneously steps on the direction key areas 370a to 370d of the platform 36a, the user can continue to perform a menu operation without being bothered.

In the ST coordinate space, an area (referred to as an invalid input area) other than the input areas 380a to 380d and the input areas 382a to 382d is set. As shown in FIG. 13, an invalid input area is provided at a boundary between each input area (area of each of the input areas 380a to 380d and the input areas 382a to 382d). For example, an invalid input area is provided in the vicinity of the origin O or at a boundary between the input area 382a and the input area 380b. If the center-of-gravity position falls within such an invalid input area, a menu operation is not performed. Specifically, when the user steps on a portion in the vicinity of the center O' of the load controller 36 of FIG. 12, the center-of-gravity position is located in the vicinity of the origin O of the ST coordinate system, and therefore, movement of the cursor 351, decision of an item and the like are not performed. Thus, by providing the invalid input area, it is possible to prevent the user from generating an erroneous input.

As described above, in this example, two menu operation methods are available (the operation method of using the load controller 36 and a foot and the operation method of using the controller 22 and a hand). When the user stands on the platform 36a of the load controller 36, a menu operation using the load controller 36 is not accepted and only a menu operation using the controller 22 is accepted. It is determined whether or not the user stands on the platform 36a of the load controller 36, based on whether or not the sum of load values detected by the four load sensors 364 is larger than or equal to a predetermined value. For example, when the sum of the load values is larger than or equal to 10 kg, it is determined that the user stands on the platform 36a of the load controller 36, and therefore, only a menu operation of the controller 22 is effective. A reason why such a process is employed will be hereinafter described.

If it is assumed that the operation method of using the load controller 36 and a foot can be used even when the user stands on the platform 36a of the load controller 36, a menu operation is likely to be performed by the load controller 36 without the user's intention. For example, when the user standing on the platform 36a of the load controller 36 is performing a menu operation using the controller 22, then if the calculated center-of-gravity position accidentally falls within any input area (382a to 382d, 380a to 380d), the game apparatus 12 recognizes that a menu operation has been performed using the load controller 36. Specifically, when the user stands on the load controller 36, then if the operation of the load controller 36 using a foot and the operation of the controller 22 using a hand are both available, an operation which is not intended by the user may be recognized.

Also, when the user tries to perform an operation using a foot while standing on the load controller 36, it is often difficult for the user to satisfactorily control the center-of-gravity position. For example, when the user puts their right foot on a desired position while standing on the load controller 36, the center-of-gravity position does not necessarily move to a position on which the right foot is put, and therefore, it is difficult for the user to perform an operation as they intend. In order for the user to move the center-of-gravity position while standing on the load controller 36, the user needs to move their weight using their whole body. Therefore, when the user moves the center-of-gravity position while standing on the load controller 36, the user needs to perform an operation in a manner different from that when the user steps on a desired portion without standing on the load controller 36. Therefore, when performing an operation using a foot, the user may be confused to decide what operation to perform.

Therefore, when the user stands on the load controller 36, then if a menu operation of the load controller 36 is not accepted and only a menu operation of the controller 22 is accepted, it is possible to prevent an operation which is not intended by the user and the confusion.

Note that, when the user does not stand on the load controller 36, both the load controller 36 and the controller 22 provide effective menu operations. In this case, if both the load controller 36 and the controller 22 simultaneously provide inputs, a menu operation is performed based on predetermined priorities. Any order of priority may be set. For example, the order of priority may be set as follows: a cross-key operation using the cross-key 26a of the input means 26>a screen pointing operation using the controller 22>an operation using the load controller 36.

Note that, in this example, the aforementioned display image 352 (see FIG. 11) is displayed on the menu screen when the user does not stand on the load controller 36, and the display image 352 is not displayed when the user stands on the load controller 36. Therefore, by viewing the menu screen, the user can easily recognize whether or not a menu operation using the load controller 36 can be performed.

Figure 14:
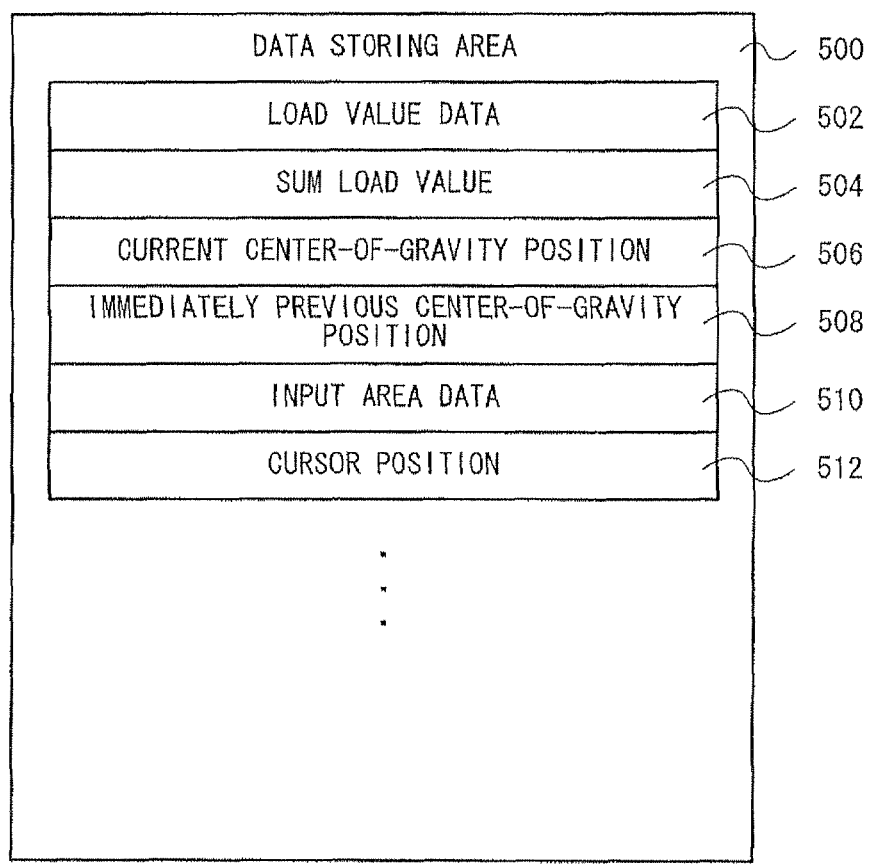
FIG. 14 is a diagram showing main data stored in an external main memory 46 of a game apparatus 12.

Next, a process of a menu operation performed in the game apparatus 12 will be described in detail. Firstly, main data which is used in the menu operation process will be described with reference to FIG. 14. FIG. 14 is a diagram showing main data stored in the external main memory 46 of the game apparatus 12. As shown in FIG. 14, a data storing area 500 of the external main memory 46 includes load value data 502, a sum load value 504, a current center-of-gravity position 506, an immediately previous center-of-gravity position 508, input area data 510, a cursor position 512, and the like. Note that the external main memory 46 stores, in addition to the data shown in FIG. 14, data required for the menu operation process, such as data of a game program for executing a game process (including a program for executing the menu operation process), data relating to a menu item (item image data, position data, etc.), data relating to a background (background image data, etc.), data relating to a position pointed by the controller 22, operation data relating to an input to the input means 26 of the controller 22, and the like.

The load value data 502 relates to load values detected by the four load sensors 364. Specifically, the load value data 502 includes a set of a load value a detected by the load sensor 364a, a load value b detected by the load sensor 364b, a load value c detected by the load sensor 364c, and a load value d detected by the load sensor 364d. The sum load value 504 is the sum of the load values detected by the four load sensors 364. Specifically, the sum load value 504 is the addition of the load values a, b, c and d.

The current center-of-gravity position 506 is coordinate data indicating a center-of-gravity position calculated based on load values currently detected by the four load sensors 364. Specifically, the current center-of-gravity position 506 is calculated by Expressions (1) and (2) using the load value data 502, i.e., the load values a, b, c and d.

The immediately previous center-of-gravity position 508 is coordinate data indicating a center-of-gravity position calculated based on load values immediately previously detected by the four load sensors 364. Load values detected by the four load sensors 364 vary depending on a position on which the user steps. The center-of-gravity position also varies depending on the load values. The immediately previous center-of-gravity position 508 is one that is calculated immediately before the current center-of-gravity position 506. Specifically, when the current center-of-gravity position is changed, the current center-of-gravity position 506 is stored as the immediately previous center-of-gravity position 508 into the external main memory 46, and a changed center-of-gravity position is stored as a new current center-of-gravity position 506 into the external main memory 46.

The input area data 510 indicates positions and sizes of the aforementioned input areas (the input areas 380a to 380d and the input areas 382a to 382d). In other words, the input area data 510 includes a set of the positions and sizes of the input areas. For example, data indicating the position of the input area 380a may be coordinate data indicating a center of the input area 380a, and data indicating the size of the input area 380a may be the length of a diagonal line of the input area 380a.

The cursor position 512 indicates a current position of the cursor 351.

Figure 15:
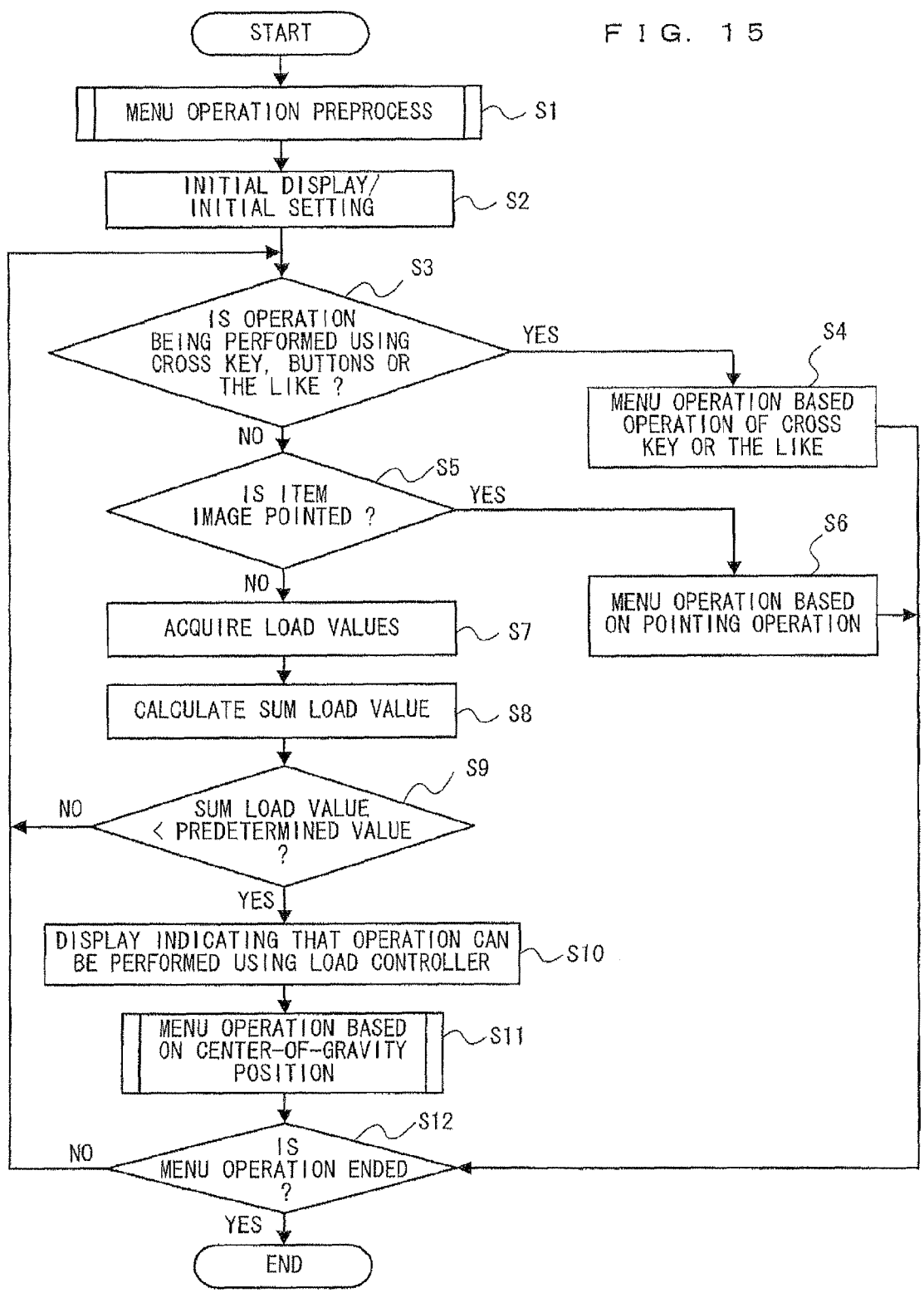
FIG. 15 is a flowchart of a menu operation process performed in the game apparatus 12.

Next, a menu operation process performed in the game apparatus 12 will be described in detail with reference to FIG. 15. FIG. 15 is a flowchart of the menu operation process performed in the game apparatus 12. When the game apparatus 12 is powered ON, the CPU 40 of the game apparatus 12 executes a boot program stored in a boot ROM (not shown), whereby each unit, such as the external main memory 46 and the like, is initialized. Thereafter, a game program stored on the optical disc 18 is read into the external main memory 46, and the CPU 40 starts execution of the game program. A program for executing the menu operation process of this example is a portion of the game program. The flowchart of FIG. 15 is one that indicates a menu operation process which is performed after the aforementioned process is completed.

Initially, in step S1, the CPU 40 executes a preprocess for a menu operation. The preprocess for a menu operation is a process which is executed before the menu operation is performed using the load controller 36, i.e., a process for correcting a zero point. The zero-point correction is a process of setting a load value detected in the absence of an applied load to each load sensor 364, to 0 (kg). Even when a load is not applied to each load sensor 364, each load sensor 364 may detect a load value as, for example, 0.1 (kg) due to a change in environment or the like. The process of step S1 redefines the detected load value as 0 (kg).

Figure 16:
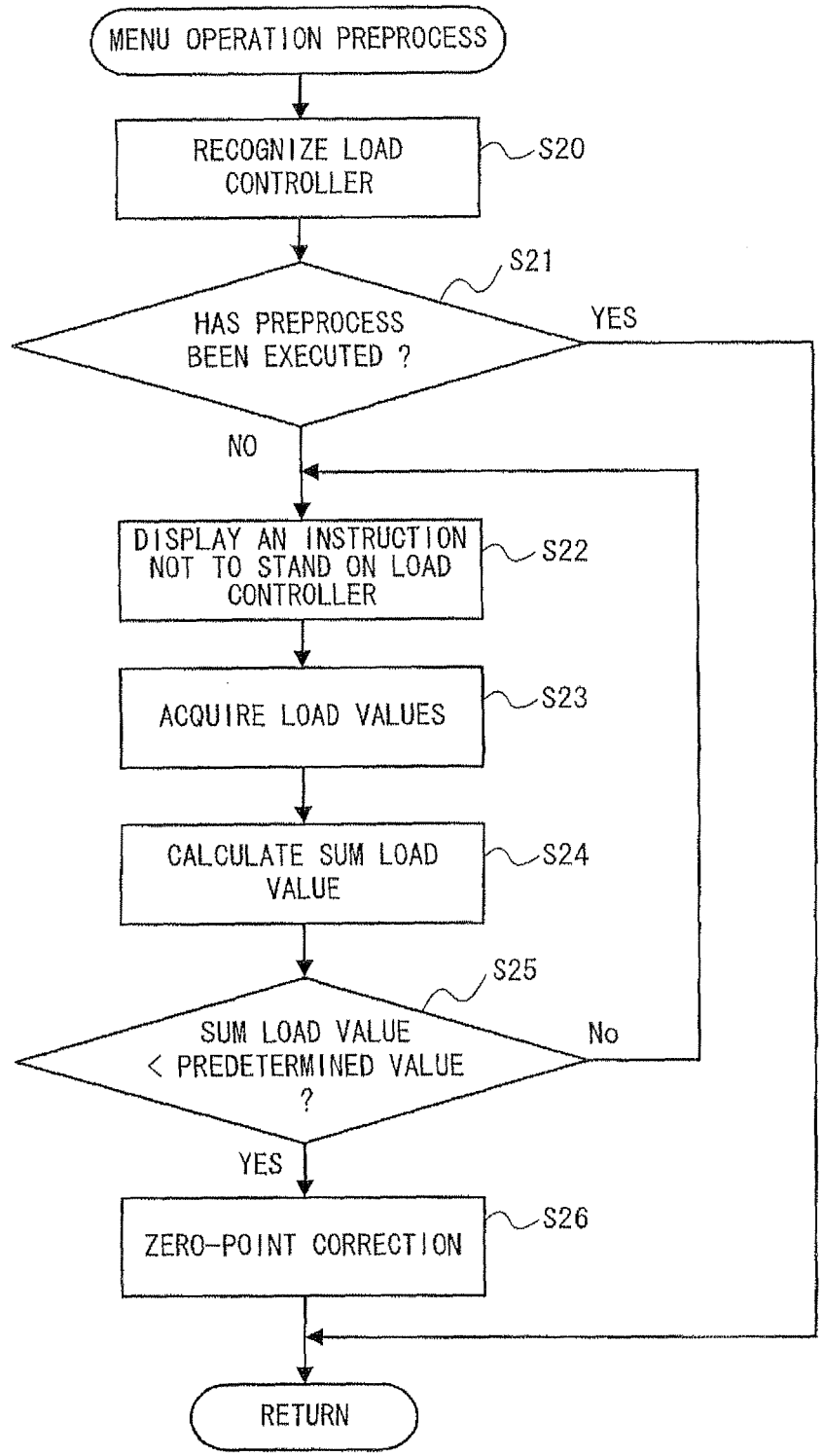
FIG. 16 is a flowchart showing details of the menu operation preprocess of FIG. 15 (step S1)

Hereinafter, the preprocess for a menu operation in step S1 will be described in detail with reference to FIG. 16. FIG. 16 is a flowchart showing details of the menu operation preprocess of FIG. 15 (step S1).

In the menu operation preprocess, initially, in step S20, recognition of the load controller 36 is executed. Here, it is determined whether or not the load controller 36 is correctly connected and is normally ready to operate. Next, the CPU 40 executes a process of step S21.

In step S21, the CPU 40 determines whether or not the preprocess (the zero-point correction process of step S26) has already been executed. The CPU 40, when executing a process of step S26 described below, stores the fact that the preprocess has been executed, into the external main memory 46. In step S21, the CPU 40 determines whether or not the preprocess has already been executed, by referring to the external main memory 46. When the result of determination is negative, the CPU 40 next executes a process of step S22. When the result of determination is positive, the CPU 40 ends the menu operation preprocess. Note that the processes of steps S22 to S26 are executed only when the menu operation process of FIG. 15 is executed for the first time. When the menu operation process of FIG. 15 is executed for the second time and thereafter, the result of determination in step S21 is positive, so that the processes of steps S22 to S26 are not executed. Specifically, after the game apparatus 12 and the load controller 36 are powered ON, once the preprocess of the load controller 36 is executed to perform the zero-point correction, the zero-point correction is no longer required. Therefore, in step S21, the CPU 40 determines whether or not the preprocess has already been executed, and if the preprocess has already been executed, ends the preprocess of FIG. 16, and returns to the menu operation process of FIG. 15.

In step S22, the CPU 40 displays on the monitor 34 a message which instructs the user not to stand on the load controller 36 (to put nothing on the load controller 36). For example, the CPU 40 displays a message that "Please do not stand on the load controller."

In step S23, the CPU 40 transmits a load acquisition command to the load controller 36 to acquire load values (or data indicating load values) of the four load sensors 364. Thereafter, the CPU 40 stores the acquired load values of the load sensors 364 as the load value data 502 into the external main memory 46. Next, the CPU 40 executes a process of step S24.

In step S24, the CPU 40 calculates a sum of the load values acquired in step S23. Specifically, the CPU 40 acquires the load value data 502 by referring to the external main memory 46 to calculate the addition of the load values detected by the four load sensors 364. Thereafter, the CPU 40 stores the calculated sum value as the sum load value 504 into the external main memory 46. Next, the CPU 40 executes a process of step S25.

In step S25, the CPU 40 determines whether or not the sum load value is smaller than a predetermined value. Specifically, the CPU 40 acquires the sum load value 504 calculated in step S24 by referring to the external main memory 46. Thereafter, the CPU 40 determines whether or not the acquired sum load value is smaller than, for example, 10 kg. If the result of determination is positive, the CPU 40 next executes a process of step S26. If the result of determination is negative, the CPU 40 returns to the process of step S22.

In step S26, the CPU 40 executes the zero-point correction. Specifically, the CPU 40, when determining that the sum load value is smaller than the predetermined value in step S25, determines that a load is not applied to the load controller 36, and defines the load value currently detected by each load sensor 364 as 0 (kg). After step S26, the CPU 40 ends the preprocess, and returns to the process of the flowchart of FIG. 15.

Referring back to FIG. 15, after the aforementioned preprocess, a process of step S2 is executed. In step S2, the CPU 40 displays an initial screen and executes initial setting. Specifically, the CPU 40 displays item images indicating items at respective predetermined positions (FIG. 11). The CPU 40 also sets positions and sizes of input areas (the input areas 380a to 380d and the input areas 382a to 382d) to respective predetermined values, which are stored as the input area data 510 in the external main memory 46.

Next, a process of step S3 is executed. In the process of step S3, it is determined whether or not a menu operation is being performed using the controller 22. When a menu operation is being performed using the controller 22, the menu operation of the controller 22 is executed with priority. In step S3, the CPU 40 determines whether or not an operation is being performed using the cross-key 26a (and other buttons) of the controller 22. When determining that an operation is being performed using the cross-key 26a or the like, the CPU 40 next executes a process of step S4. On the other hand, when an operation is not being performed using the cross-key 26a or the like, the CPU 40 next executes a process of step S5.

In step S4, the CPU 40 executes a menu operation based on an operation performed using the cross-key 26a or the like. In step S4, an input by the input means 26 of the controller 22 is accepted, and a process corresponding to the input is executed. Specifically, when an operation is performed using the cross-key 26a, a process of moving the cursor 351 is performed. When an operation has been performed using the input means 26 other than the cross-key 26a, a process of deciding an item corresponding to each button (the "+" button 26g, the A-button 26d, the B-switch 26i, etc.) is performed, for example. Specifically, for example, when an operation is performed using the cross-key 26a, the CPU 40 moves the cursor 351 in an upward or downward (or rightward or leftward) direction, depending on the operation of the cross-key 26a. Also, for example, when the "+" button 26g is pushed down, the CPU 40 decides an item selected by the cursor 351 (an exercise type corresponding to an item image 350). Note that a process which is performed, depending on the type of each button, is not particularly limited. Also, the buttons and the processes are associated with each other in any manner (e.g., the 1-button 26b is used to decide an item, the B-switch 26*i* is used to return to the previous screen, etc.). After step S4, the CPU 40 executes a process of step S12.

On the other hand, when an operation is not being performed using the cross-key 26*a* or the like (the result of determination in step S3 is negative), the CPU 40 determines whether or not an item image 350 is pointed by the controller 22 in step S5. Specifically, the CPU 40 determines whether or not a position pointed by the controller 22 falls within an area where an item image 350 is displayed. When the position pointed by the controller 22 falls within an area where an item image 350 is displayed, the CPU 40 determines that an item is pointed by the controller 22. Conversely, when the position pointed by the controller 22 does not fall within an area where an item image 350 is displayed, the CPU 40 determines that an item is not pointed by the controller 22. When the result of determination in step S5 is positive, the CPU 40 next executes a process of step S6. When the result of determination is negative, the CPU 40 next executes a process of step S7.

In step S6, the CPU 40 executes a menu process based on a pointing operation using the controller 22. Specifically, the CPU 40 moves the cursor 351 to an item image 350 pointed by the controller 22.

In step S7, the CPU 40 acquires load values from the load controller 36. Specifically, the CPU 40 transmits a load acquisition command to the load controller 36 to acquire load values (or data indicating the load values) of the four load sensors 364. Thereafter, the CPU 40 stores the acquired load values of the load sensors 364 as the load value data 502 into the external main memory 46. Next, the CPU 40 executes a process of step S8.

In step S8, the CPU 40 calculates a sum of the load values acquired in step S7. Specifically, the CPU 40 acquires the load value data 502 by referring to the external main memory 46 and calculates the addition of the load values detected by the four load sensors 364. Thereafter, the CPU 40 stores the calculated sum value as the sum load value 504 into the external main memory 46. Next, the CPU 40 executes a process of step S9.

In step S9, the CPU 40 determines whether or not the sum load value is smaller than a predetermined value. Specifically, the CPU 40 acquires the sum load value 504 by referring to the external main memory 46 and determines whether or not the sum load value is smaller than, for example, 10 kg. The process of step S9 determines whether or not the user stands on the load controller 36. When the result of determination is positive, the CPU 40 next executes a process of step S10. When the result of determination is negative, the CPU 40 returns to the process of step S3.

In step S10, the CPU 40 displays on the monitor 34 a display (the display image 352 of FIG. 11) indicating that a menu operation can be performed using the load controller 36. Next, the CPU 40 executes a process of step S11.

Figure 17:
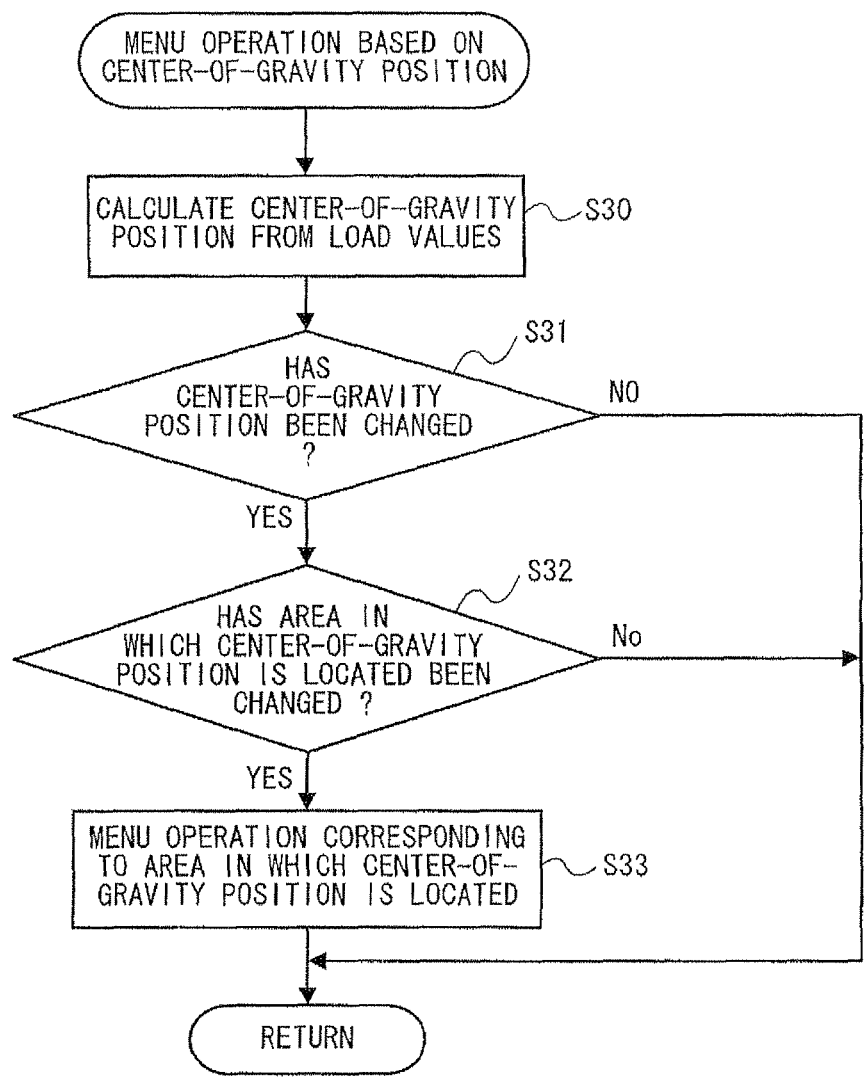
FIG. 17 is a flowchart showing details of the menu operation process based on a center-of-gravity position of FIG. 15 (step S11)

In step S11, the CPU 40 executes a menu operation process based on a center-of-gravity position. Hereinafter, the menu operation process based on a center-of-gravity position in step S11 will be described in detail with reference to FIG. 17. FIG. 17 is a flowchart showing details of the menu operation process based on a center-of-gravity position of FIG. 15 (step S11).

Initially, in step S30, the CPU 40 calculates a center-of-gravity position from load values. Specifically, the CPU 40 acquires the load value data 502 by referring to the external main memory 46. Next, the CPU 40 calculates a center-of-gravity position based on the acquired load values of the load sensors 364. The calculation of a center-of-gravity position is executed in accordance with Expressions (1) and (2) above. Thereafter, the CPU 40 stores the current center-of-gravity position 506 stored in the external main memory 46 as a new immediately previous center-of-gravity position 508 into the external main memory 46. Moreover, the CPU 40 stores the calculated center-of-gravity position as a new current center-of-gravity position 506 into the external main memory 46. As a result, a center-of-gravity position calculated in the current step S30 is stored as the current center-of-gravity position 506 into the external main memory 46, and a center-of-gravity position calculated in the previous step S30 is stored as the immediately previous center-of-gravity position 508 into the external main memory 46. Next, the CPU 40 executes a process of step S31.

In step S31, the CPU 40 determines whether or not the center-of-gravity position has been changed. Specifically, the CPU 40 determines whether or not a current center-of-gravity position calculated in the immediately previous step S30 has been changed from the previously calculated center-of-gravity position. More specifically, the CPU 40 acquires the current center-of-gravity position 506 and the immediately previous center-of-gravity position 508 by referring to the external main memory 46. When the current center-of-gravity position 506 is different from the immediately previous center-of-gravity position 508, the CPU 40 determines that the center-of-gravity position has been changed, and next executes a process of step S32. When the current center-of-gravity position 506 is the same as the immediately previous center-of-gravity position 508, the CPU 40 determines that the center-of-gravity position has not been changed, and ends the menu operation process based on a center-of-gravity position.

In step S32, the CPU 40 determines whether or not an area in which a center-of-gravity position is located has been changed. Specifically, the CPU 40 determines in which of the input areas (380*a* to 380*d* and 382*a* to 382*d*) and the invalid input areas a current center-of-gravity position is located, based on the current center-of-gravity position 506. The CPU 40 also determines in which of the input areas and the invalid input areas the immediately previous center-of-gravity position is located, based on the immediately previous center-of-gravity position 508. Thereafter, the CPU 40 determines whether or not an area in which the current center-of-gravity position is located (one of the input areas and the invalid input areas) has been changed from an area in which the immediately previous center-of-gravity position is located. For example, when the current center-of-gravity position is located in the input area 380*c* and the immediately previous center-of-gravity position is located in an invalid input area, the CPU 40 determines that the area in which the center-of-gravity position is located has been changed. On the other hand, when the current center-of-gravity position is located in the input area 380*c* and the immediately previous center-of-gravity position is located in the input area 380*c*, the CPU 40 determines that the area in which the center-of-gravity position is located has not been changed. When the result of determination is positive, the CPU 40 next executes a process of step S33. When the result of determination is negative, the CPU 40 ends the menu operation process, and returns to the process shown in the flowchart of FIG. 15.

The process of step S32 determines whether or not the center-of-gravity position has been changed from one area to another area (these areas are any of the input areas and the invalid input areas of FIG. 13). Specifically, even when the current center-of-gravity position is different from the immediately previous center-of-gravity position, then if the current center-of-gravity position and the immediately center-of-gravity position are located in the same area, the CPU 40 does not determine that a new menu operation has been operated, and ends the menu operation process based on a center-of-gravity position. In other words, only when the user steps on the load controller 36 for the first time, a menu operation is performed, depending on a stepped position, and when the user subsequently continues to step on the load controller 36, a menu operation is not performed. Therefore, for example, when the user moves the cursor 351 from a position of the item image 350*b* of FIG. 11 to a position of the item image 350*d* which is the second item image below from the item image 350*b*, the user steps on the downward key area 370*c* (see FIG. 12) of the platform 36*a*, and once takes their foot off the platform 36*a* (or moves the foot close to a center of the platform 36*a*), and steps on the downward key area 370*c* again.

Next, in step S33, the CPU 40 executes a menu operation process corresponding to an area in which a center-of-gravity position is located. Specifically, for example, when a current center-of-gravity position is located in the input area 380*a*, the CPU 40 moves the cursor 351 in an upward direction. Also, for example, when a current center-of-gravity position is located in the input area 382*a* or the input area 382*c*, the CPU 40 decides an item selected by the cursor 351. Also, when a current center-of-gravity position is located in an invalid input area, the CPU 40 does not execute a menu operation. Thereafter, the CPU 40 ends the menu operation process, and returns to the process shown in the flowchart of FIG. 15.

Referring back to FIG. 15, in step S12, the CPU 40 determines whether or not the menu operation has been ended. Specifically, when a final item decision operation or the like has been performed in the immediately previous step S11 or S4, the CPU 40 determines that the menu operation has been ended. When an operation other than the final item decision operation or the like has been performed, the CPU 40 does not determine that the menu operation has been ended. Here, the final item decision operation or the like is an operation which is performed by the user in step S11 or S4, and includes an operation of finally deciding an item (game type) selected by the cursor 351, an operation of transitioning to a screen other than the menu screen (operation of ending the menu operation), and the like. Operations other than the final item decision operation or the like include, for example, an operation of moving the cursor 351 by the user, an operation of displaying a detailed menu screen for selecting more detailed items by the user, and the like. When the result of determination is positive, the CPU 40 ends the process. When the result of determination is negative, the CPU 40 returns to the process of step S3.

In this manner, a menu operation of using the load controller 36 and a foot is performed. Thus, in a game apparatus, such as the load controller 36, in which input is performed by a center-of-gravity position, a menu operation can be performed, depending on the center-of-gravity position. Also, even when the user stands on the load controller 36, then if an input operation using the load controller 36 is accepted, the operability may be deteriorated as described above. Therefore, if an input operation using the load controller 36 is accepted only when the user does not stand on the load controller 36, the user can easily perform a desired operation. Even when the load controller 36 and another input device which can be operated using a hand are available in the game apparatus 12, then if an input operation using the load controller 36 is accepted only when the user does not stand on the load controller 36, the operability for the user is improved. In other words, it is possible to prevent the user from entering an input without the user's intention when two input devices are available.

Note that, in the aforementioned example, load values (or data indicating the load values) are acquired from the load controller 36, and a center-of-gravity position is calculated in the game apparatus 12. Alternatively, the game apparatus 12 may detect a center-of-gravity position based on an input signal (data indicating load values or a center-of-gravity position) from the load controller 36. For example, the load controller 36 may calculate and transmit load values and a center-of-gravity position to the game apparatus 12.

Also, in the aforementioned example, it is determined whether or not the sum load value is smaller than a predetermined value, and only when the result of determination is positive, a menu operation using the load controller 36 is caused to be effective. In another example, the threshold used in this determination may be changed, depending on the weight of the user. The weight of the user may be previously stored in the game apparatus 12 and may be selected by the user before an operation. Alternatively, the weight of the user may be input every operation.

Also, in the aforementioned example, the input areas 382*a* to 382*d* used to decide an item or the like are set to be smaller than the input areas 380*a* to 380*d* used to move the cursor 351. Alternatively, distances between a predetermined point in the ST coordinate space (e.g., the origin O) and the input areas 382*a* to 382*d* may be set to be longer than distances between the point and the input areas 380*a* to 380*d*. Specifically, a center-of-gravity position is determined by differences between load values detected by the load sensors 364, and therefore, if a center-of-gravity position in the absence of a load applied to the load controller 36 is set as an origin, the difference between load values needs to be increased (i.e., a larger load needs to be applied) with a distance from the origin. Conversely, when an applied load is small, the load difference is small, so that the calculated center-of-gravity position is closer to the origin.

Also, in the aforementioned example, the load controller 36 includes the four load sensors 364. In other examples, the load controller 36 may include three or less load sensors or five or more load sensors. Also, as long as a center-of-gravity position of applied loads can be obtained, the load controller 36 may be any device and may not include a plurality of load sensors as is different from the aforementioned example.

Also, in the aforementioned example, only when an area in which a current center-of-gravity position is located has been changed from an area in which the immediately previous center-of-gravity position is located, a menu operation is executed (steps S32 and S33). Alternatively, even when an area in which a current center-of-gravity position is located is the same as an area in which the immediately previous center-of-gravity position is located, a menu operation may be executed. In this case, for example, when the user continues to step on the downward key area 370*c* of the platform 36*a*, the cursor 351 is continuously moved downward.

Certain example embodiments are also applicable to an information processing apparatus other than a game apparatus. For example, an input device, such as the load controller 36, which can enter an input based a center-of-gravity position is connected to a personal computer, and the input device can be used to perform a menu operation similar to that described above. Also, in such a personal computer, a pointer indicating a position on a display screen may be caused to correspond to a center-of-gravity position, and the pointer may be operated, depending on a change in center-of-gravity position, thereby causing the personal computer to execute a predetermined process.

Figure 18:
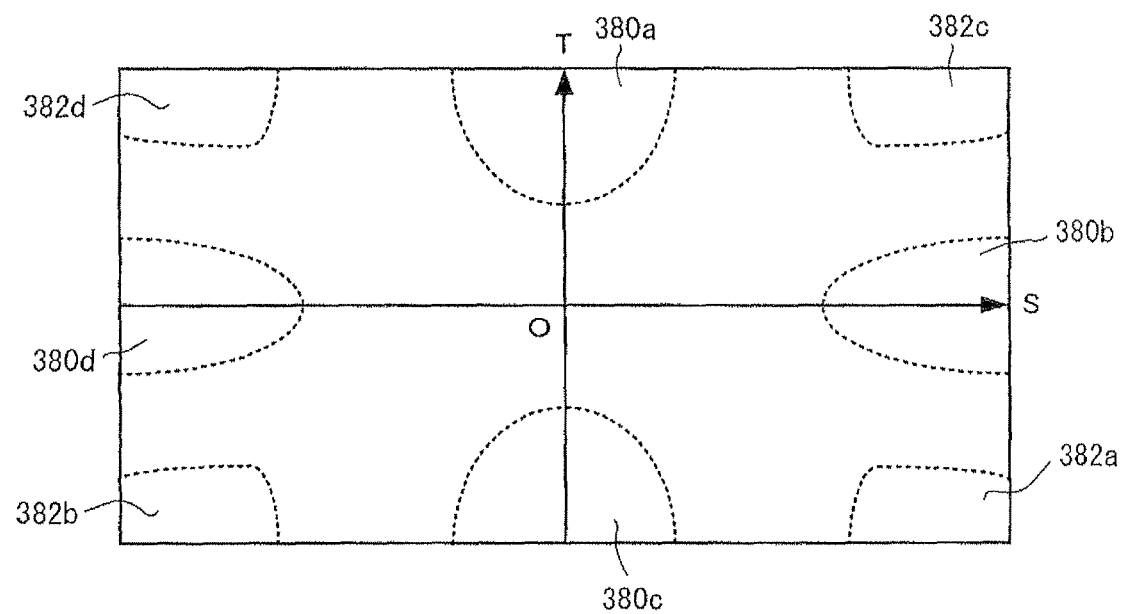
FIG. 18 is a diagram showing the shape of each input area in another example.

Also, in the aforementioned example, as shown in FIG. 13, each input area is in the shape of a rectangle. In other examples, each input area may have any shape. For example, referring to FIG. 18, each input area may be defined with a curved line. FIG. 18 is a diagram showing the shape of each input area in another example. As shown in FIG. 18, each input area may have a shape which becomes narrower toward the origin O. In this case, it is possible to prevent a center-of-gravity position from toughing a portion of one input area until the center-of-gravity position reaches another input area. As a result, erroneous recognition can be prevented, and therefore, the user can easily perform a desired operation. Also, the number of input areas and the positions and arrangement of the input areas are not particularly limited. For example, in FIG. 12, the operation areas (370a to 370d and 372a to 372d) may be arranged around a point (e.g., a point above and to the right of the center O' in FIG. 12) different from the center O' of the load controller 36, and the input areas (380a to 380d and 382a to 382d) may be set, corresponding to positions of the respective operation areas. Moreover, for example, only four input areas 380a to 380d may be provided, and only two input areas 380a and 380c may be provided.

Also, sizes (or distances from the origin) of the input areas 382a to 382d and the input areas 380a to 380d may be changed, depending on the situation of an operation. For example, on an operation screen on which an item decision operation or the like is more often used than an item selection operation, the input areas 382a to 382d used for the item decision operation or the like may be set to be larger than the input areas 380a to 380d used for the item selection operation. An example of such an operation screen is a setting wizard of an information processing apparatus. Specifically, in the setting wizard in which default settings are previously defined, most users use the default settings, however, some users enter their own settings. In this case, most users only make a decision on setting screens successively displayed, and therefore, if the input areas 382a to 382d used for the item decision operation or the like are larger than the input areas 380a to 380d used for the item selection operation, the operability is improved.

Also, the input operation using the load controller 36 is not limited to the aforementioned menu operation. For example, the load controller 36 can be used to move an object provided in a game space, or cause the object to perform a predetermined motion. In other words, the load controller 36 can be used to perform an operation similar to that which is performed using the conventional input means 26 (a cross-key, a button, etc.). A process performed by this operation is not particularly limited.

As described above, certain example embodiments can execute a process based on a center-of-gravity position, and is applicable as, for example, a game apparatus and a game program.

While certain embodiments have been described in detail, the foregoing description is in all aspects illustrative and not restrictive. It is understood that numerous other modifications and variations can be devised without departing from the scope of the invention.

The invention claimed is:

1. A non-transitory computer readable storage medium storing computer readable instructions for use with an information processing apparatus that is configured to process a signal which is based on a load value output from a first input device including an input surface and a load sensor that is configured to detect the load value applied to the input surface, the stored computer readable instructions comprising instructions configured to:

determine a center-of-gravity position of a load applied to the input surface of the first input device based on the signal output from the first input device;

perform a determination of whether or not the load value applied to the input surface of the first input device is smaller than a predetermined value, based on the signal output from the first input device; and execute a predetermined process based on the center-of-gravity position when a result of the determination of the load value is positive, wherein execution of the predetermined process is further based on comparing the center-of-gravity position to a plurality of areas that correspond to sections of the input surface.

2. The medium of claim 1, wherein:

the first input device outputs the load value detected by the load sensor, the center-of-gravity position is calculated based on the load value, and the determination is further based on the load value detected by the load sensor.

3. The medium of claim 1, wherein:

the first input device includes a plurality of load sensors, each one of the load sensors configured to detect a load value, the center-of-gravity position is determined based on the load values detected by the plurality of load sensors, and the load value applied to the input surface is substantially the sum of the load values of the plurality of detected load values.

4. The medium of claim 1, wherein the instructions are further configured to output a display indicating that an operation using the first input device is available, when the result of the determination of the load value applied to the input surface is positive.

5. The medium of claim 1, wherein the instructions are further configured to execute a menu operation process for selecting and deciding an item as the predetermined process.

6. An apparatus for processing a signal which is based on a load value output from a first input device that includes an input surface and at least one load sensor that is configured to detect the load value applied to the input surface, the apparatus comprising:

a processing system that includes at least one processor, the processing system configured to:

determine a center-of-gravity position of a load applied to the input surface of the first input device based on the signal output from the first input device;

perform a determination of whether or not the load value applied to the input surface of the first input device is smaller than a predetermined value;

execute a predetermined process based on the center-of-gravity position when a result of the determination is the load value being smaller than the predetermined value;

assign a plurality of areas to portions of the input surface; and determine when the center-of-gravity position is within at least one of the plurality of areas, wherein the execution of the predetermined process is further based the determination of when the center-of-gravity position is within at least one of the plurality of areas.

7. The apparatus of claim 6, wherein the processing system is further configured to receive, from the first input device, the load value detected by the at least one load sensor, wherein the center-of-gravity position is calculated based on the received load value, and the load value applied to the input surface that is used in the determination is based on the load value detected by the at least one load sensor.

8. The apparatus of claim 6, wherein:

the at least one load sensor is a plurality of load sensors that respectively output a load sensor value, the center-of-gravity position is determined based on the load sensor value detected by the plurality of load sensors, and the load value applied to the input surface is substantially the sum of the load sensor value of the plurality of detected load values.

9. An information processing system that is configured to process a signal which is based on a load value output from a first input device that includes an input surface and at least one load sensor that is configured to detect the load value applied to the input surface, the apparatus comprising:

a processing system that includes at least one processor, the processing system configured to:

determine a center-of-gravity position of a load applied to the input surface of the first input device based on the signal output from the first input device;

perform a determination of whether or not the load value applied to the input surface of the first input device is smaller than a predetermined value; and execute a predetermined process based on the center-of-gravity position when a result of the determination is the load value being smaller than the predetermined value;

assign a plurality of areas to portions of the input surface; and determine when the center-of-gravity position is within at least one of the plurality of areas, wherein the execution of the predetermined process is further based the determination of when the center-of-gravity position is within at least one of the plurality of areas.

10. The system of claim 9, wherein the processing system is further configured to receive, from the first input device, the load value detected by the at least one load sensor, wherein the center-of-gravity position is calculated based on the received load value, and the load value applied to the input surface is based on the load value detected by the at least one load sensor.

11. The system of claim 9, wherein:

the at least one load sensor is a plurality of load sensors that respectively output a load sensor value, the center-of-gravity position is determined based on the load sensor value detected by the plurality of load sensors, and the load value applied to the input surface is substantially the sum of the load sensor value of the plurality of detected load values.

12. A computer implemented method for use with an information processing apparatus that is configured to process a signal which is based on a load value output from a first input device including an input surface and a load sensor that is configured to detect the load value applied to the input surface, the method comprising:

determining a center-of-gravity position of a load applied to the input surface of the first input device based on the signal output from the first input device;

performing a determination of whether or not the load value applied to the input surface of the first input device is smaller than a predetermined value, based on the signal output from the first input device;

executing a predetermined process, on a processing system that includes at least one processor, based on the center-of-gravity position when a result of the determination of the load value is positive;

assigning a plurality of areas to portions of the input surface; and comparing the center-of-gravity position to at least one of the plurality of areas to make a determination of when the center-of-gravity position is within at least one of the plurality of areas, wherein executing the predetermined process is further based the determination.

13. The method of claim 12, wherein:

the at least one load sensor is a plurality of load sensors that respectively output a load sensor value, the center-of-gravity position is determined based on the load sensor values output by the plurality of load sensors, and the load value applied to the input surface is substantially the sum of the output load sensor values.

14. An input device, comprising:

an input surface that is configured to accept a load value applied thereto, where subsections of the input surface are respectively associated with a plurality of areas;

at least one load sensor that is configured to detect the load value applied to the input surface; and a communicator that is set to communicate a signal based on the detected load value to a processing system that is configured to:

determine a center-of-gravity position of a load applied to the input surface of the input device based on the communicated signal;

determine when the load value applied to the input surface of the input device is smaller than a predetermined value;

execute a process based on the determined center-of-gravity position when the load value is smaller than the predetermined value; and compare the center-of-gravity position to at least one of the plurality of areas to make a determination of when the center-of-gravity position is within at least one of the plurality of areas, wherein executing the predetermined process is further based the determination.

15. The input device of claim 14, wherein:

the at least one load sensor is a plurality of load sensors that are respectively configured to output a load sensor value, the center-of-gravity position is determined based on the load sensor value output by the plurality of load sensors, and the load value applied to the input surface is substantially the sum of the output load sensor values.

* * * * *